US012629678B2

(12) United States Patent
Fleischman et al.

(10) Patent No.: US 12,629,678 B2
(45) Date of Patent: May 19, 2026

(54) MULTIPLEX ASSAY READER AND MICROFLUIDIC TEST CARTRIDGE

(71) Applicant: CLEU DIAGNOSTICS, LLC, Philadelphia, PA (US)

(72) Inventors: Andrew Fleischman, Philadelphia, PA (US); Kamyar Ghofrani, Whitby (CA); Bayan Mashrequi, Toronto (CA)

(73) Assignee: CLEU DIAGNOSTICS, LLC, Ardmore, PA (US)

(*) Notice: Subject to any disclaimer, the term of this patent is extended or adjusted under 35 U.S.C. 154(b) by 0 days.

(21) Appl. No.: 18/830,245

(22) Filed: Sep. 10, 2024

(65) Prior Publication Data

US 2025/0025877 A1 Jan. 23, 2025

Related U.S. Application Data

(63) Continuation of application No. PCT/US2024/038899, filed on Jul. 19, 2024.

(60) Provisional application No. 63/599,854, filed on Nov. 16, 2023, provisional application No. 63/527,659, filed on Jul. 19, 2023.

(51) Int. Cl.
*B01L 3/00* (2006.01)

(52) U.S. Cl.
CPC ..... *B01L 3/502746* (2013.01); *B01L 2200/04* (2013.01); *B01L 2300/0654* (2013.01); *B01L 2300/0816* (2013.01); *B01L 2300/0877* (2013.01); *B01L 2300/0883* (2013.01)

(58) Field of Classification Search
None
See application file for complete search history.

(56) References Cited

U.S. PATENT DOCUMENTS

| | | | | |
|---|---|---|---|---|
| 5,984,184 | A | 11/1999 | Kojima | |
| 2004/0022677 | A1 | 2/2004 | Wohlstadter | |
| 2008/0283602 | A1 | 11/2008 | Fagrenius | |
| 2011/0150703 | A1 * | 6/2011 | Castro | B01F 25/431971 422/68.1 |
| 2016/0153878 | A1 | 6/2016 | Candon | |
| 2017/0016845 | A1 * | 1/2017 | Lee | G01N 27/3272 |
| 2018/0093268 | A1 * | 4/2018 | Meier | C23C 14/024 |

(Continued)

FOREIGN PATENT DOCUMENTS

EP 2157189 A1 * 2/2010 ........ B01L 3/502776

OTHER PUBLICATIONS

Written Opinion of the International Searching Authority mailed Nov. 21, 2024, in International Application No. PCT/US24/38899.

(Continued)

*Primary Examiner* — Matthew D Krcha
*Assistant Examiner* — Brittany I Fisher
(74) *Attorney, Agent, or Firm* — FisherBroyles, LLP

(57) ABSTRACT

A card reading system in which electrical contacts between the assay card and the card reader are made through vertical actuation of a card interface relative to the assay card. In one embodiment, the assay card reading system comprises: (a) a card reader comprising at least one card interface, the card interface having a plurality of card interface contacts; (b) an assay card having card contacts; (c) a vertical actuation mechanism for causing relative vertical movement between the assay card and the card interface to contact at least a portion of the card interface contacts with the card contacts.

27 Claims, 13 Drawing Sheets

(56) References Cited

U.S. PATENT DOCUMENTS

| | | | | |
|---|---|---|---|---|
| 2020/0038871 | A1* | 2/2020 | Barany | B01L 7/52 |
| 2020/0338560 | A1* | 10/2020 | Vin Raviv | B01L 3/527 |
| 2022/0357321 | A1 | 11/2022 | Xie | |

OTHER PUBLICATIONS

International Search Report mailed Nov. 21, 2024, in International Application No. PCT/US24/38899.

* cited by examiner

SECTION A-A

SECTION A-A

SECTION B-B

Fig. 4A (Top)

SECTION A-A

SECTION B-B

SECTION C-C

SECTION D-D

SECTION A-A

SECTION B-B

SECTION C-C

DETAIL A

DETAIL B

MULTIPLEX ASSAY READER AND MICROFLUIDIC TEST CARTRIDGE

I. CROSS-REFERENCE TO RELATED APPLICATIONS

The present ent application is a continuation of International Application No. PCT/US24/38899, fled Jul. 19, 2024, which claims priority to U.S. Provisional Patent Application Ser. No. 63/527,659, filed Jul. 19, 2023, and U.S. Provisional Patent Application Ser. No. 63/599,854, Nov. 16, 2023. The disclosure of each of which are hereby incorporated by reference in their entirety.

II. FIELD OF THE INVENTION

This present disclosure relates generally to a multiplexed microfluidic based assay system, comprising a test reader and disposable microfluidic test cartridge/card, as well as individual components, and methods of use thereof for conducting diagnostic assays, as well as associated test kits.

III. BACKGROUND OF THE INVENTION

Clinical lab testing plays a crucial role in diagnosing, monitoring, and treating patients by analyzing various types of biological specimens and providing clinical results that are actionable for physicians and nurses on the front lines of healthcare. Clinical lab testing at hospitals and other healthcare facilities is commonly conducted at a centralized lab to allow batch testing of a large number of clinical samples in parallel with large high throughput instruments to improve efficiency. However, there are significant drawbacks to a traditional centralized lab, which have made it difficult to improve the quality, speed, and cost effectiveness of clinical lab testing over the past several decades. Clinical labs should employ highly trained staff around the clock to perform rigorous and labor-intensive quality control and calibration procedures each day to ensure test reliability. Shortages of skilled personnel and labor costs are a major burden and can substantially increase the cost of providing lab services especially at low volume centers. Except for annual preventative labs performed after a primary care visit or less common specialty lab tests conducted at central satellite labs, most lab testing is performed for acute patient care at hospitals, emergency departments, urgent care centers, and physician offices. The timeliness of lab test results is critical for patient care. But centralized lab testing is commonly plagued by long turnaround times, which can slow down treatment decisions that impact patient outcomes and delay discharges. There is a balance between trying to provide rapid test results, while also batching tests to manage costs. Turnaround times can vary depending on how quickly test samples can be transferred to the appropriate central location, and the rules implemented to wait for a certain number of samples to arrive to be run as a batch of tests. At a hospital lab, high-throughput instruments that are designed to run hundreds or even thousands of samples at one time are actually used to run only a small number of samples to avoid delays. When used in this manner, the efficiency and cost savings of using large instruments is completely lost. Finally, ambulatory care facilities, such as physician offices, surgery centers, and long-term care facilities, have no access to lab testing unless they are in close proximity to a central lab.

Physicians have long talked about revolutionizing healthcare with 'near-patient' or point-of-care testing. Point-of-care testing platforms are portable in vitro diagnostic systems that are designed to be simple and easy to use ('low complexity'), controlling all sources of error so that reliable results can be achieved by anyone even without extensive knowledge or training. Point-of-care testing can also significantly reduce turnaround times for test results and provides the portability for tests to be performed essentially anywhere, including at ambulatory facilities that usually do not have access to lab testing. Despite numerous advantages, point-of-care tests are used sparingly and have not evolved as quickly as anticipated. This is due to numerous challenges. Disposable test cartridges/cards for point-of-care platforms often cost 10-30-fold more than reagent packs for tests performed on traditional high throughput lab instruments. Despite only running one test at a time, point-of-care test readers often still require a relatively large footprint and are expensive relative to their throughput. For example, it would not be practical or cost-effective to operate a bank of point-of-care instruments to meet the daily demand as a central lab replacement at a facility that runs a large number of tests daily. Finally, point-of-care testing platforms often offer only a very limited test menu on any on device. In such a case, dozens of different devices would be required to replace the versatility of a central lab.

There is a need to continue to evolve point-of-care testing devices to become more versatile lab replacements by overcoming the limitations of existing platforms. This need includes incorporating the ability to multiplex by performing a large number of tests with a variety of test modalities which can be configured to conduct many different test panels. Furthermore, this capability should be provided within a highly integrated and compact test reader that utilizes a small footprint and disposable test cartridges, both of which can be fabricated easily and at a low-cost so as to make the platform scalable and cost-effective when compared to testing at a central lab. Central to these requirements is the ability to precisely control a small biological fluid sample within a complex microfluidic flow cell, metering said sample into many individual microfluidic channels which can be independently controlled and avoiding pitfalls that commonly impact the performance of tests using small disposable microfluidic test cartridges. The present invention fulfills this need among others.

IV. SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

One aspect of the present invention is a card reading system in which electrical contacts between the assay card and the card reader are made through vertical actuation of a card interface relative to the assay card. In one embodiment, the assay card reading system comprises: (a) a card reader comprising at least one card interface, the card interface having a plurality of card interface contacts; (b) an assay card having card contacts; (c) a vertical actuation mechanism for causing relative vertical movement between the assay card and the card interface to contact at least a portion of the card interface contacts with the card contacts. In one embodiment, the vertical actuation mechanism is connected to the card interface and actuates the card interface vertically.

Another aspect of the present invention is an assay card reading system having a two-step alignment configuration. In one embodiment, the assay card reading system comprises: (a) an assay card having a top side, a bottom side, and one or more edges, and comprising at least, (i) one or more first alignment fiducials on at least one of the edges; (ii) one or more second alignment fiducials on the top side or the bottom side; and (b) a card reader comprising at least, (i) a card bay for receiving an assay card; (ii) one or more first fiducial cooperating members along at least one side of the card bay to engage the first fiducials and provide initial alignment of the assay card in the card bay; and (iii) at least one card interface above and/or below the card bay, the card interface comprising one or more second fiducial cooperating members, and the card interface having at least two states, a first state in which the card interface is distal from the card bay allowing an assay card to be received in the card bay, and a second state in which the second fiducial cooperating members engage the second fiducials on the assay card, to provide final alignment of the assay card relative to the card interface.

Yet another aspect of the invention is an assay card reading system which prevents improper insertion of a test card, accommodates cards of variable thickness and length, and/or synergistically holds down and ejects cards. In one embodiment, the assay card reading system comprises: (a) an assay card having sides and at least one first component of an interengagement mechanism along one of the sides; (b) a card reader comprising at least, (i) a card bay for receiving an assay card; (ii) a second component of the interengagement mechanism for interengaging with the first component to hold the assay card in a predetermined position within the card bay, wherein the assay is positioned in the predetermined position by the interengagement mechanism and not by a register surface.

Still another aspect of the invention is an assay card reading system that can accommodate cards of different thicknesses. In one embodiment, the assay card reader comprises: (a) a card bay for receiving an assay card; (b) a card interface disposed over or under the card bay, the card interface having a plurality of resilient connectors, the card interface having at least two states, a first state in which the card interface is distal from the card bay with the resilient connectors at a fully extended length allowing an assay card to be received in the card bay without making contact with the card interface, and a second state in which the resilient connectors contact the assay card and become at least partially compressed.

Another aspect of the invention is an assay card reading system having one or more different heating zones with enhanced cooling and/or interlocks to prevent hot cards from being removed and new cards from being inserted while the reader is too hot. In one embodiment, the card reader comprises: (a) a card bay for receiving an assay card; (b) a card interface above or below the card bay and configured to move vertically, the card interface having at least two states, a first state in which the card interface is distal from the card bay allowing an assay card to be received in the card bay, and a second state in which the card interface contacts an assay card; and (c) at least one discrete heating zone in said card interface which comes into contact with the assay card and controls the temperature of the assay card when the card interface is in the second state. In one embodiment, the card interface comprises at least two or more heating zones.

Yet another aspect of the invention is improved manufacturability of the card by using a uniform body in one embodiment. In one embodiment, the assay card comprises: (a) first and second layers, the first layer overlaying the second layer to define a space therebetween; (b) a microfluidic channel in the space; and (c) wherein the second layer and the channel are formed in a unified body.

Still another aspect of the invention are capillary filament disrupters disposed in the microfluidic channels to disrupt capillary filaments. In one embodiment, the card comprises: (a) at least first and second layers, wherein the second layer defines at least one channel and the first layer overlays the second layer thereby defining at least one corner in the channel between the first and second layers; and (b) one or more capillary filament disrupters disposed in the at least one corner to disrupt capillary filaments.

Another aspect of the invention are lateral flow enhancers to moderate flow in the microfluidic channels. In one embodiment, the card comprises: (a) a base; (b) at least one microfluidic channel in or on the base for conducting a flow of a fluid, the microfluidic channel defined by sides 804 and a width 805 between the sides; and (c) one or more lateral flow enhancers, each lateral flow enhancer spanning across at least a substantial portion of the width to create a lateral capillary action perpendicular to the flow, thereby causing flow laterally to the sides to fill the width of the channel before the flow of fluid continues past the lateral capillary enhancer, thereby resulting in flow across the width. In one embodiment, lateral flow enhancer extends entirely across the width.

Another aspect of the invention is capacitive monitoring of flow in the microfluidic channel for high resolution metering and/or for detection of reuse of previously wetted test cards, and/or test cards with inadequate volume. In one embodiment, the card comprises: (a) a base; (b) at least one microfluidic channel defined in or on the base, the channel configured to conducting fluid from a port: and (c) two or more capacitive elements positioned consecutively along the channel, the capacitive elements being electrically connected by a conductive traces outside of the channel such that a discrete increase in capacitance is detectable as the fluid flows from one capacitive element to a consecutive capacitive element. In one embodiment, the two or more capacitive elements comprise more than three consecutive capacitive elements.

Still other aspects and embodiments of the present invention will be obvious to those of skill in the art in light of this disclosure.

V. BRIEF DESCRIPTION OF THE FIGURES

FIG. 1 is an external perspective view of one embodiment of an assembled instrument FIG. 2A is a front view of one embodiment of an assembled instrument FIG. 2B is a vertical cross section view (Section A-A) through the center of one embodiment of an assembled instrument FIG. 3A is a perspective view of one embodiment of a core module assembly FIG. 3B is a front view of one embodiment of the core module assembly FIG. 3C is a downward-facing view of a horizontal cross section (Section A-A) of one embodiment of the core module assembly FIG. 3D is an upward-facing view of a horizontal cross section (Section B-B) of one embodiment of the core module assembly FIG. 4A is a top view of one embodiment of the core module assembly showing the section line for subsequent vertical cross sections FIG. 4B is a view of a vertical cross section (Section A-A) through one embodiment of the core module assembly with the platform in a fully open position FIG. 4C is a view of a vertical cross section (Section B-B) through one embodiment of the core module assembly with the platform in an intermediate position FIG. 4D is a view of a vertical cross section (Section C-C) through one embodiment of the core module assembly with the platform in a fully closed or clamped position.

VI. DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various features(s) of the "present invention" throughout this document does not mean that all claimed embodiments or methods must include the referenced feature(s).

A next generation point-of-care lab replacement platform should be low-cost and compact while still delivering highly multiplexed test panels with advanced fluidics to achieve similar performance to centralized lab tests. There are significant limitations that have prevented existing systems from achieving these goals. Low-cost platforms have only offered simple fluidics and basic analytics. Platforms with advanced capabilities typically use large format injection molded test panels that are extremely costly. Innovative new strategies are needed to achieve a high level of multiplexing with advanced fluidics in a low-cost form factor.

Figure 1:
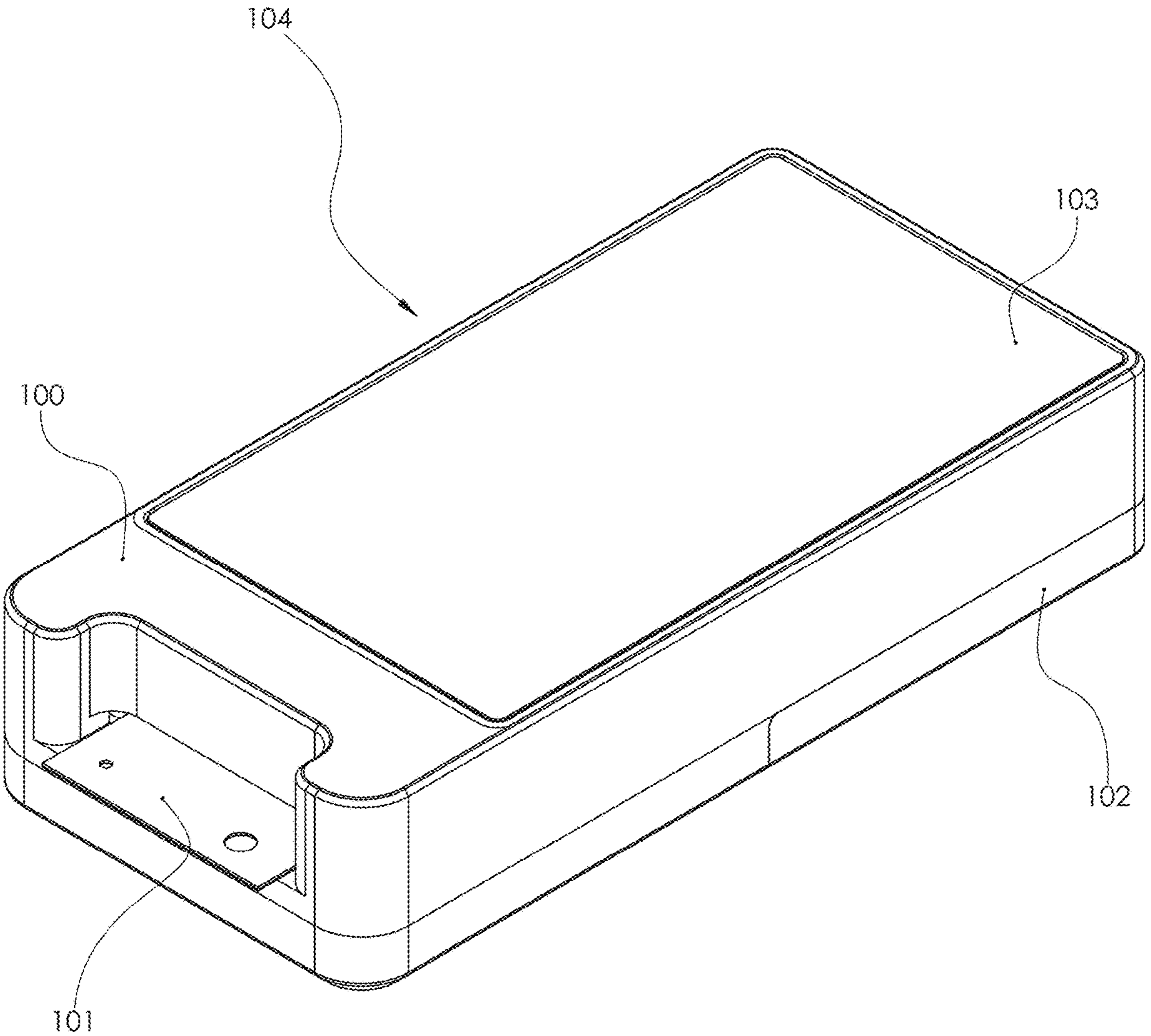

Referring to FIG. 1, one embodiment of a small compact point-of-care lab instrument is shown in a perspective view. In this embodiment, the instrument has an external housing 100 such that an assay card 101 is inserted into the instrument through the housing. The portable instrument also has a battery compartment 102 and a display 103.

Figure 2A:
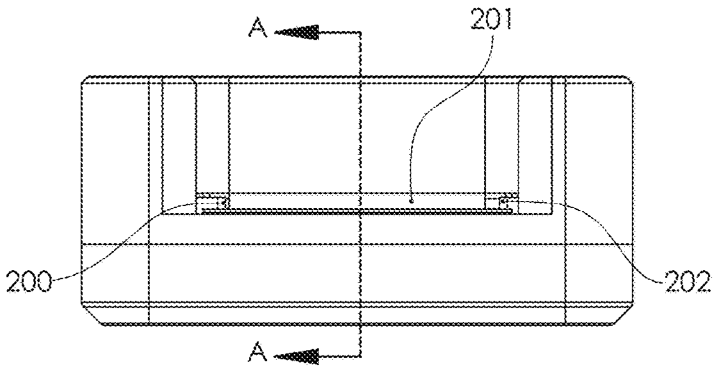
Figure 2B:
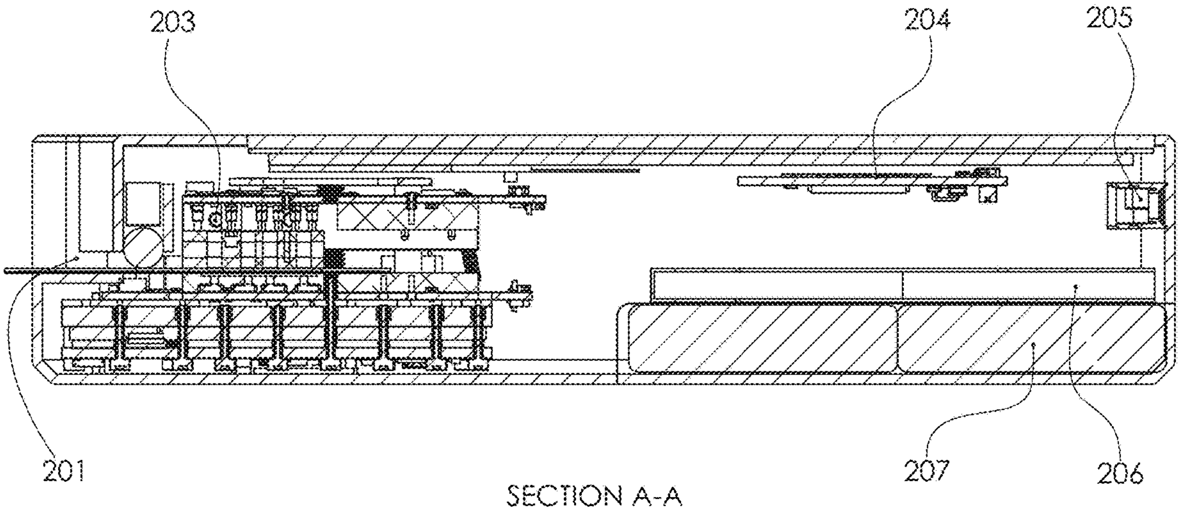
Figure 3A:
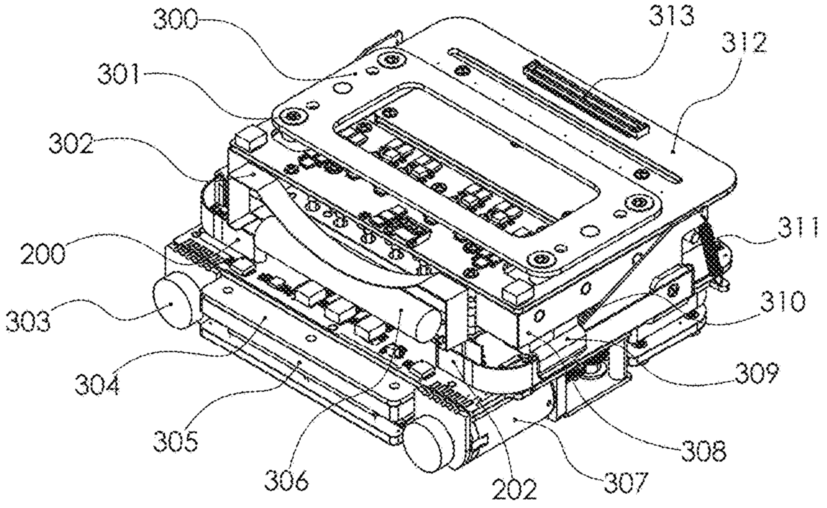
Figure 3B:
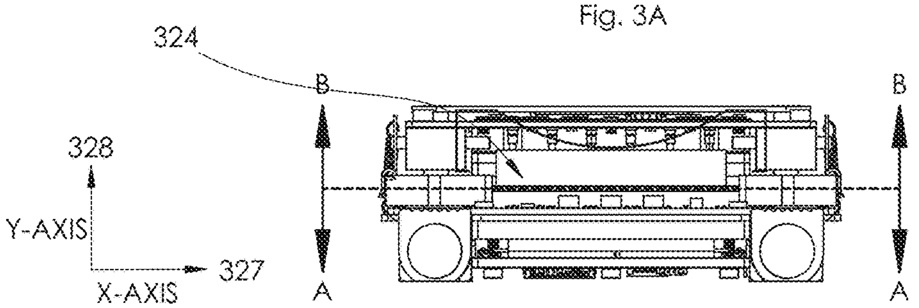
Figure 3C:
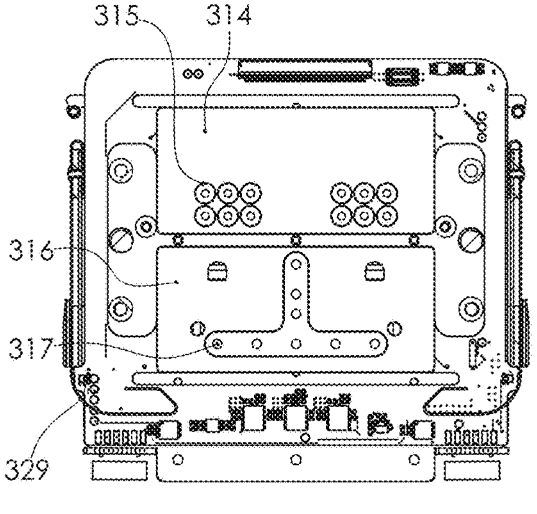
Figure 3D:
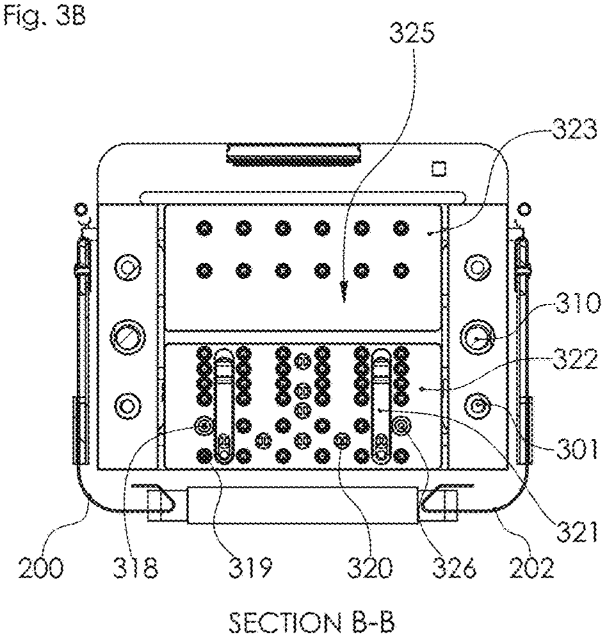

Referring to FIG. 2A, an embodiment of a point-of-care instrument is again shown with a front view. The front of the external housing comprises a slot 201 for entry of the test card into the card bay. Entry of the test card through the slot is obstructed by the large latch 200 on one side and the small latch 202 on the other side. The front end of the test card may have tapered corners on each side that are larger enough to clear the corresponding latch for the test card to gain entry into the card bay. As seen in a vertical cross section through the instrument in FIG. 2B, the instrument contains a core module 203 which is a self-contained mechanical assembly that accepts the assay card upon insertion through a slot 201 in the external housing and can perform highly multiplexed functions required by an advanced diagnostic platform, a control electronics board 204 that interfaces with both the core module and also the display to control an on-board operating system with a user interface, an optical barcode scanner 205, a cooling fan assembly 206 for cooling the core module during operation, and removable battery 207 that can be replaced within the battery compartment.

Electronic Connections Between Test Card and Card Reader

A major limitation of typical microfluidic devices is the number of electronic connections that can be made between the card reader and test card. Consequently, advanced devices that require a large number of connections per assay channel have had limited multiplexing capability. For example, high resolution metering is key to advanced fluidic control but requires multiple sensing points within each microfluidic channel that connects back to the card reader. Each electrochemical assay also requires at least two electrodes that all connect back to the card reader. With current design limitations, a highly multiplexed device with both high-resolution metering and electrochemical sensing in each channel would require a complex weave of conductive traces on a test card such that each conductive traces can be traced back to a connector to interface with the test system. However, there is a practical limit to the number of connections that can be traced back to the edge of a test card to interface with a typical edge connector, since the paths of the traces cannot overlap or cross over each other. There have been few, if any instruments, that utilize island contacts, which are contacts that interface with the instrument but that are not located at the end of the test card for an edge connector. A reliable method is needed to interface with island contacts to allow connections to be made across the entire area of the test card. It is an object of this invention to disclose a compact test system that can provide a reliable interface for a plurality of independent connections between a card reader and test card, including island contacts.

As compared to typical card readers for a diagnostic platform, the disclosed device, in one embodiment, does not contain an edge connector to make contact with the test cartridge during insertion. In fact, in one embodiment, no physical connection is made between the card reader and test card initially upon insertion into the card bay by the user. The disclosed system, in one embodiment, utilizes a moving platform that contains the card interface and is located above the card bay that receives the test card. The card interface on the platform, in one embodiment, contains an array with multiple rows of spring-loaded pin connectors (sometimes referred to as "pogo pins"). The spring connectors are assembled in a grid on a printed circuit board (PCB). Standard PCB fabrication methods can achieve a tolerance within +100 microns for the mounting location of pin connectors on the grid. In addition to connectors, in one embodiment, two alignment pins with a conical shaped tip are also mounted onto the PCB during assembly such that they are positioned in registration to the position of the pin connectors on the array. In one embodiment, the moving platform has at least two states, a first state in which the platform is positioned distal to the card bay such that test card can be inserted into the card bay, and a second state in which the platform converges with the card bay such that the pin connectors can make contact with the test card. Two motorized lead screws actuate the platform between the first state and second state, in one embodiment. The pins on the platform can make connections to conductive contact pads that are screen-printed with carbon and/or silver ink in a corresponding grid pattern across the test card. Since contact is made from above the entire test card, in one embodiment, island contacts can be positioned throughout the assay card. In one embodiment, the contact pads on the test card are screen-printed in registration to two alignment holes, which are through holes cut out of the top and base layers of the test card. In one embodiment, the connections between pin connectors and contact pads on the test card are made through apertures or holes cut only in the top layer of the test card overlying each contact pad. In other embodiments, the connections could also be made with vias. The test card is initially inserted and captured by a latch system, in one embodiment, which provides preliminary positional alignment of the test card with a tolerance of approximately +1 mm from its nominal position along the X and Y axes. This ensures that the test card is in a suitable position for the alignment pins on the platform to engage the alignment holes; larger misalignment could cause damage to the card reader or test card if the alignment pin misses the hole and instead pierces the test card. Once the test card is captured, in one embodiment, the moving platform then descends to allow the alignment pins to engage the alignment holes, which provides a fine adjustment of the position of the test card based on the tight fit of the alignment pins in the alignment holes in the base layer of the test card. The alignment hole in the top layer may be oversized relative to the hole in the base layer, such that misalignment between the base layer and top layer of the test card does not affect the alignment of the pins to the contact pads which are on the base. The alignment pins provide registration between the contact pads on the base and the connector array on the platform such that each pin connector lines up to the center of the contact pad and makes contact. Additionally, the alignment pins may also provide fine alignment of optical apertures on the test card and optical detection elements on the card reader. Once the moving platform comes to a stop in the second state and the alignment pins are fully engaged, in one embodiment, fine adjustment of the position of the test card by the alignment pins aligns the contact pads on the base of the test card and connector array within a tolerance of approximately +0.5 mm from nominal in both the X and Y axes. This ensures that each spring pin connector will make contact with its corresponding contact pad based on the relative size of the contact pads. Although the connectors on the platform should align with contact pads on the base of the test card, apertures or holes in the top layer should also line up to allow access to the contact pads. The contact pads are nominally positioned directly below the apertures or holes in the top layer of the test card. An alignment tolerance of approximately +0.4 mm in the X and Y axes for lamination of the base layer and top layer of the test card is sufficient to guarantee successful contact. This level of tolerance can be easily achieved with typical high speed fabrication processes that utilize machine vision and/or other common alignment techniques during lamination. Upon making contact with the connector array, contact pads on the base can be used to transmit signals from capacitive sensing elements, short detection elements, assay electrodes, and/or any other electronic signals back through the pin connectors. Using island contacts dramatically increases the usable space on the test card, since a large number of connections can be made across its entire surface area. Additionally, this approach significantly shortens the length of traces, which reduces leakage and can improve the quality of signals to the device. In one embodiment, there are 46 pin connectors positioned across the array on the platform in two separate thermal heating zones. Test cards thus would correspondingly have up to 46 contact pads and associated apertures.

Two Stage Alignment of Test Card and Card Reader

Certain features of a card reader for a diagnostic platform, such as the pin connectors and optical detection system, require precise alignment to the test card after its inserted into the card bay. In a typical in vitro diagnostic device, the fit of the test card within the card bay physically aligns the test card to the card reader. More specifically, the fit of the edges or corners of the test card to the sides or corners of the card bay provide alignment. However, in such cases, the alignment tolerances of the system depend on the precise assembly of the card bay in reference to other components within the card reader, such as the pin connectors or optical detection system, which may not be directly opposed with each other, and singulation tolerances for each individual test card. This becomes cumbersome with highly multiplexed platforms that have a large number of components that require tight alignment. Physical alignment of test cards based on their fit into the card bay also confines the dimensions of the test card to one size fits all. It is an objective of this invention to disclose a test system that automatically aligns test cards of various lengths after insertion into a card reader by the user.

In the disclosed device, in one embodiment, the alignment between the card reader and test card occurs in two steps, in one embodiment. For example, a test card is first inserted into the card bay with a sliding action, and latches on each side of the card bay capture the test card by engaging with notches on each side of the test card. In one embodiment, the latches engage the notches and capture the card in its initial position, which provides preliminary positional alignment within +1 mm of nominal along the X and Y axes. This level of positional alignment is sufficient for the conical alignment pins to engage alignment holes on the test card without risk of piercing through the test card due to severe misalignment. Subsequently, the moving platform descends, in one embodiment, and the alignment pins engage alignment holes in the base layer of the test card. The closely toleranced fit of the alignment pins in the alignment holes provides fine adjustment of the position of the test card relative to platform containing the card interface. In one embodiment, the engagement of the notches by the latches allows some level of movement such that fine alignment by the alignment pins can adjust the position of the latches within the notches. In one embodiment, the first alignment hole provides constraint in two dimensions and a second alignment hole provides constraint only in one dimension. In one embodiment, the first alignment hole in the test card is round, and the second alignment hole in the test card has is round at the ends but slightly elongated in one axis such that the alignment pin is not constrained in the alignment hole along that one axis. Unlike a typical device which aligns the card reader to the test card based on the fit of the test card within the card bay, the final alignment of the test card in the disclosed system, in one embodiment, is provided only by the alignment pins on the platform which contains the card interface. Thus, the mechanical position of the card bay during assembly affects only initial alignment but does not determine the final position of the test card relative to the platform. The platform contains a PCB, which is assembled with alignment pins and all other components that interface with and be aligned to the test card, such as pin connectors, mounted in tight registration. In one embodiment, the optical detection system is also mounted onto the PCB to provide alignment of the optical components and optical apertures on the test card. Standard PCB assembly methods can achieve alignment tolerances of +0.100 mm, which ensures that the critical elements of the card reader that interface with the test card are all tightly aligned to the alignment pins on the platform. Once the alignment pins engage the alignment holes on the test card, this alignment mechanism ensures that the card interface is tightly aligned based on its registration to the base layer of the test card. During test card fabrication, the alignment holes are registered to the position of the screen-printed elements, such as contact pads, within +0.150 mm. Since the alignment pins are registered on the PCB to the pin connectors, the alignment process ensures that the pin connectors and contact pads will be aligned with less than a +0.500 mm tolerance such that the pin connectors will make contact with the contact pads. Unlike most test systems, alignment is not dependent on the fit of an edge or corner of the test card against a side or corner of the card bay, neither of which would be registered to any feature on the individual test card or pin connectors on the platform. Alignment with this technique is achieved by utilizing those features that can be manufactured with the best possible alignment tolerances. For example, alignment tolerances for screen-printing can be within +0.150 mm, and the pin connector mounting with PCB assembly on the platform can achieved within +0.100 mm. On the contrary, the mechanical assembly of the instrument housing and card bay would not be finely registered to any of these features that require tight alignment, such as those on the platform. It would be prohibitively expensive or possibly not even feasible to implement a manufacturing assembly process that can control the alignment of such features to the required tolerances. The connector array of one embodiment includes, for example, 46 pogo pins that form a connection with contact pads on the test card. The optical system in one embodiment includes 8 optical detectors that align with optical apertures on the test card. The number of features that require alignment in a highly multiplexed test system was the motivation for the disclosed invention which can achieve alignment between the device and many different elements across the test card.

Card Reader Accepts Variable Card Lengths and Thicknesses While Preventing Buckling For one diagnostic platform device to be capable of performing a range of diagnostic tests, from blood chemistries to high sensitivity immunoassays and nucleic acid amplification, a device should have the flexibility to accept test cartridges/cards with a wide range of form factors. For example, low-cost microfluidic test cards manufactured with a roll to roll technique would typically use thin films (0.3-1 mm) that can be rolled up and loaded onto an automated roll-to-roll manufacturing line. Despite the advantage of fabricating test cards using roll films, thin flexible test cards have certain challenges. Thin test cards can bend and buckle during insertion, especially when they are large in size. Some diagnostic tests may require metallized blister packs or injection molded components that have a larger minimum thickness (0.5-3 mm). Similarly, it would typically be advantageous to optimize the size of the test card to fit the required number of assays on a test panel. A smaller form factor can maximize throughput and reduce cost in manufacturing. Complex test panels with numerous reagents and a large number of microfluidic channels would require more space than a simple test with few reagents and a single microfluidic channel. Also, some test panels can be run at a single reaction temperature, whereas others, such as nucleic acid amplification, require multiple temperature zones to quickly shuffle the test sample between various reaction temperatures. It is an object of this invention to disclose the design of a test system that can utilize test cards that are from at least 0.3 to 3 mm thick and at least 40 to 75 mm in length, with longer test cards operating across two or more independently controlled and thermally isolated temperature zones. It is an object of this invention to disclose a design of a test system that can prevent buckling of a flexible thin test card.

The disclosed test system, in one embodiment, implements a platform containing the card interface that can move vertically into position to receive test cards of varying thicknesses up to at least 3 mm or more into the card bay depending on the allowable space in the inside of the device and the working range of spring connectors on the card interface. In one embodiment, the test system has a shutter behind the front entry slot in the housing leading into the card bay. The shutter is biased downward by a leaf spring such that it blocks the entry slot. The shutter may also have a beveled edge that is engaged by the front end of a test card such that the test card can lift the shutter upward and out of its way to allow entry of test cards of different thicknesses into the card bay. In one embodiment, leaf springs on the shutter can compress to allow test cards as thick as the entire height of the entry slot into the housing to be inserted through the entry slot. The downward force of the shutter on the test card shutter provides biases the test card downward and prevents buckling of a test card during insertion. The shutter has the additional function of blocking some light from entering the instrument housing. In other embodiments, the shutter can be a roller that is also biased downward by a leaf spring. The rounded shape of the roller is similar to the beveled edge in that the front edge of the test card can wedge under the roller and lift it up the against the leaf springs to allow insertion of the test card. While the shutter provides a downward force at the front entry of the device, additional leaf springs in the rear of the card bay coming down from the platform above the card bay may also bias the test card downward until it is completely seated in the device, preventing buckling or improper positioning of a thin flexible test card. These features may be important for allowing test cards as thin as 0.3 mm to be inserted into the instrument. For example, initially, the leaf springs are fully extended and are in contact with the bottom surface of the card bay such that they will be engaged by a test card of any thickness entering through the entry slot. The leaf springs can compress completely to be flush with the platform surface when the platform compresses down on the test card. The rear leaf springs also provide a downward force on the test card as the platform ascends to eject the alignment pins from alignment hole in the test card. Without the rear leaf springs, the test card can become stuck on the alignment pins and rise with the ascending platform. Since there is no edge connector, there is no shear force required to engage spring connectors during insertion, which would otherwise cause thin test cards to bend and buckle.

In one embodiment, when the test card is in position, the moving platform descends onto the test card from above and engages it with alignment pins to optimize test card position relative to the pin connector array on the card interface to establish electronic connections. The card interface, in one embodiment, contains spring loaded pin connectors that are initially fully extended when the test card is inserted, and compress at least partially as the platform converges down onto the test card. The spring connectors have a working range such that they can become flush with the heating plate on the platform. The amount that each of the spring connectors compresses depends on whether all of the spring connectors engage with the base of the test card through apertures. If all of the spring connectors enter through apertures to engage the base, then all of the spring connectors should compress to their solid length. If some of the spring connectors engage the top of the test card and do not enter apertures to contact the base, then only those spring connectors contacting the top of the test card will compress completely to their solid length. Consequently, those spring connectors entering through apertures to the base will be partially compressed by an amount that depends on the thickness of the top layer of the test card. The working range of the spring connectors determines that maximum thickness of the top layer of the test card that can be used if not all spring connectors through apertures.

A typical diagnostic test systems utilizes physical guides and springs to constrain a test card from its front edge upon insertion, which requires a one-size fits all test card. This also puts the emphasis on the assembly of physical guides and springs within the instrument housing to ensure alignment tolerances of the device are met. This can be challenging because there is often no physical connection between the guides and the features on the instrument (e.g. pin connectors and optical components) that are ultimately aligned to the test card after its inserted. Instead, the disclosed test system, in one embodiment, uses latches to capture the test card from notches cut into the sides of the test card. Since there is no physical constraint based on the front edge of the card, test cards of varying lengths can be used. Although there is physical constraint from latches on the sides of the test card, the latch system only provides the preliminary positional alignment of the test card. The final alignment comes from alignment pins on the card interface itself. The alignment pins descend with the platform and fine tune the position of the test card such that it is aligned to the connectors on the card interface and optical system on the platform. The disclosed system, in one embodiment, also has at least two independent temperature zones. Each zone has thermally isolated heating plates, one set in the front and one set in the back. Tests that require dual temperature control will be longer such that they extend from the first temperature zone to the second temperature zone. For example, test cards up to 55 mm in length extend across the one set of top and bottom heating plates in the first temperature zone and test cards greater than 55 mm in length extend into the second temperature zone such that the temperature of the front of the test card is thermally controlled by the heating plates in the first temperature zone and the temperature of the back of the test card extends into the second temperature control zone. If only one temperature zone is required, test cards may be 55 mm or less to maximize throughput in fabrication by fitting more cards per sheet or per roll.

Card Reader Prevents Insertion of Test Card in the Improper Orientation

For a diagnostic platform to be simple for untrained users, the goal is to design controls to prevent improper use. For example, the test system would optimally be designed such that a test card cannot be inserted in the incorrect orientation. It is an object of this invention to disclose the design of a test system that prevents improper insertion of the test card, either upside down or backwards, which would not allow proper function.

The disclosed device, in one embodiment, utilizes a latching system which both captures a test card and also prevents improper insertion of a test card. In addition to capturing the test card by engaging the notches on the side edges of the test card, the latches also serve as obstructions to inserting a test card improperly. In other aspects, the latching and obstructing functions could be achieved by two separate components within the device. The latches are leaf springs that compress when they actuate outwards away from the card bay and then recoil back towards the card bay to extend back to their relaxed state. The leaf springs partially block the slot that is the entryway to the card bay such that a typical test card with square corners cannot physically be inserted. In one embodiment, the front corners of the test card have tapers. The tapered corners of the test card engage the leaf springs of the latches such that the leaf springs compress and are displaced outward away from the card bay. In such a manner, the front end of the test card can clear the latches and the test card can be fully advanced into the device. In other embodiments, the geometry of the front edge of the test card may simply physically clear the obstruction at the front of the card bay without needing to physically displace or actuate the obstruction. For example, a slit on the front edge of the card may line up with an obstruction such that the front edge only can clear the obstruction if inserted properly. In some embodiments, the obstruction may actuate outward away from the card bay by an automated mechanism upon detection of the test card. In one embodiment, in addition to being an obstruction, the primary function of the latches is to engage the notches on the sides of the test card to capture the test card. Once the tapered corners clear the leaf springs and displace them outward away from the card bay into a compressed position, the compressed leaf springs continue to glide along the side edges of the test card as it is inserted until reaching the notches. The leaf springs then recoil to extend inward to engage the notches to capture the test card in place. This ensures the test card stops at a predetermined position during insertion based on the location of the notches. Since the test card is captured by the latches on the sides only and there is no physical backstop to the card bay, test cards of varying lengths can be inserted into the card bay. In fact, the test card does not necessarily need to contact the sides of the card bay at all as long as the latches can engage. In some aspects, the predetermined position for capturing the test card needs to be set such that alignment pins can successfully engage with alignment holes on the test card. Thus, the latches also provide preliminary positional alignment. Improper positioning of the test card could cause the alignment pins to pierce the test card which could damage either the test card or card reader. In addition to capturing the test card and providing preliminary alignment, the leaf springs also center the test card within the card bay. In one embodiment, only the front edge and not the back edge of the test card has tapered corners. If a test card is inserted backwards, the square corners on the back edge cannot engage with and clear the leaf springs. Thus, the latches obstruct the test card from being inserted backwards. In addition, the latches and tapers on one side of the card bay and test card, respectively, are larger than those on the opposite side. The larger latch leaf spring provides a larger obstruction that correspondingly requires a larger taper to engage and clear the leaf spring. In one embodiment, the smaller taper on the opposite side of the test card is not able to clear the obstruction from the larger latch leaf spring. This blocks insertion of the test card upside down such that the small taper would be hindered from clearing the larger latch.

Thermally Isolated Temperature Control Zones

Diagnostic tests often require tightly controlled reaction temperatures in order to achieve consistent performance. For example, the kinetics of enzymes in certain assays may increase with the reaction temperature up to the optimal temperature, which is commonly near human body temperature (37° C.). Other reactions, such as isothermal amplification, have an optimal performance at higher temperatures of about 65° C. Some reagents may be highly sensitive to temperature and become deactivated when heated above a certain temperature. In one particular example, heating saliva or nasal swab samples to 95° C. for 5-10 minutes can be used as a method to inactivate proteinase enzymes, which are introduced to inactivate nuclease enzymes. This two-step method could avoid the need for sample extraction. However, heat inactivated samples should then quickly revert to lower temperatures for nucleic acid amplification. For a test system to be practical for use with multiple tests at vastly different reaction temperatures and individual tests that require rapidly varying reaction temperatures, the test system should have multiple thermally isolated temperature zones with a large temperature gradient between the zones. The device should also have the capability to rapidly cool to avoid long delays between tests while the system reaches an acceptable temperature for the next test. The test system should also be able to prevent the removal of test cards that could be hot and prevent the insertion of test cards that could be damaged by high temperatures before the system cools. It is an object of this invention to disclose a test system that incorporates at least two independent temperature zones with a temperature difference of at least 40° C. between zones, and that can rapidly cool from 95° C. to 35° C. within 3-5 minutes or less. It is also an object of this invention to disclose a method to prevent insertion or removal of a test card when the device temperature is outside of the acceptable range.

Figure 9:
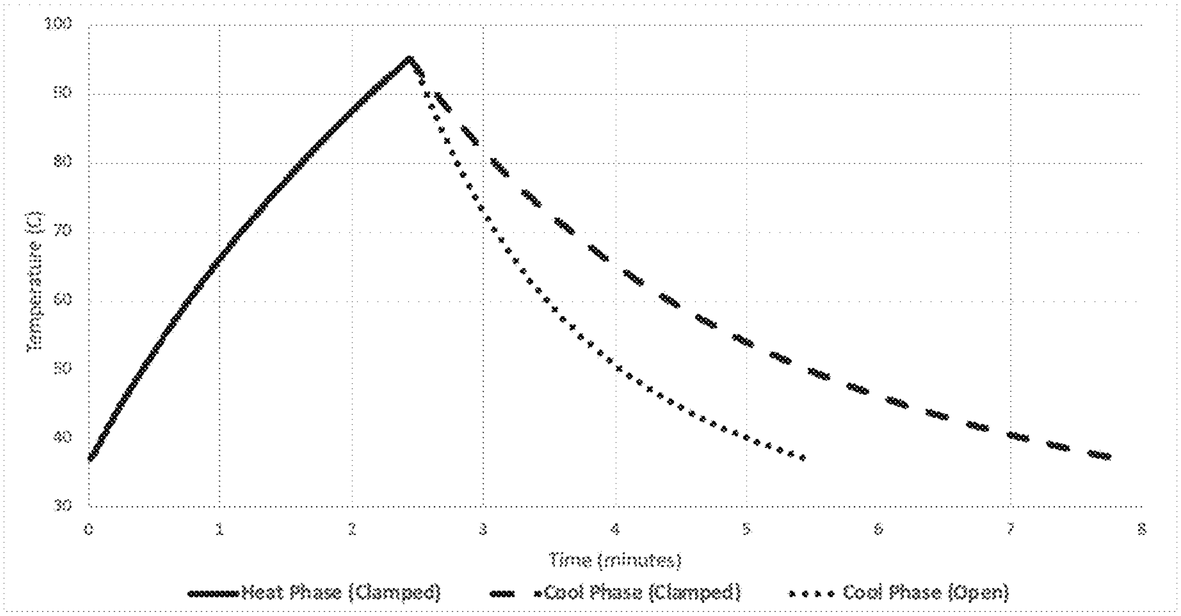
FIG. 9 is a graph showing heating time with clamped/closed platform and cooling time with clamped/closed versus open platform.

The disclosed test system, in one embodiment, has at least two thermally isolated temperature zones that each have top and bottom aluminum heating plates with a closed loop temperature control system with temperature sensors. The temperature zones are thermally isolated. Thermal isolation is achieved, in one embodiment, with a structural assembly that utilizes plastic supports with no thermally conductive materials connecting between the two zones. The plastic supports, also referred to as plastic side sliders, are thermally insulated (non-conductive) parts that hold together the platform and limit the transmission of heat between the temperature zones. The flexibility of the plastic side sliders is also important to allow for slight misalignment of the threaded screws for each of the two motors; flexible sliders can allow rapid adjustment to prevent jamming of the lead screws and motors that move the platform vertically up and down. If one motor moves more quickly than the other and becomes out of sync, the plastic side sliders can bend slightly to prevent jamming. When the platform bottoms out at the bottom of the threaded screw, the two motors will again become in sync. The plastic side sliders connect the moving platform and temperature zones without any thermally conductive metal contacts between the zones. In one embodiment, even when heated to 95° C., the second temperature zone can remain below 60° C., and both zones can cool back down to a 35° C. standard operating temperature of the device in less than about 5 minutes. The air flow within the test system has been optimized with a high flow fan positioned behind or under the assembly. Air flow moves through the center of the assembly between the top and bottom heating plates to maximize cooling. When the moving platform is in the closed or clamped state there is less air flow between the heating plates. Air flow and speed of cooling is increased by maximizing the distance between the two heating plates in the open or unclamped state when the moving stage is in its most distal position. Referring to FIG. 9, heating and cooling times were tested experimentally. After heating the temperature zone to 95° C. and then starting to cool, the temperature zone cooled to 37° C. as much as 45% faster when the moving platform was in an open position with the top heating plate distal to the bottom heating plate to allow maximum air flow between the plates compared to having the moving platform in its clamped state with no space between the top and bottom plates.

In one embodiment, when the moving platform is in a closed or clamped position during a test, the test card is compressed between the platform and stage below the card bay. This compression force prevents removal of the test card while the test card is very hot. The compression force also protects the alignment pins and pin connectors on the platform. Once the platform moves to its most distal position to maximize cooling, in one embodiment, the platform pushes the locks down to engage with the latch system and prevent actuation of the latches. The latch locks prevent insertion of a test card when the system is not ready to accept a new test, for example, if the card bay is still very hot. The locks are also connected to the moving platform by a spring. When the test system is ready to accept a new test card, in one embodiment, the platform moves to a slightly less distal position which puts tension on the spring which disengages the locks from the latch. This position is considered the first state because the card reader is ready to receive a test card into the card bay. The test device can detect, in one embodiment, the insertion of the test card based on the position of the latch leaf springs, which are monitored by hall effect sensors. Hall effect sensors and magnets monitor the physical position of the latch leaf springs during the process of inserting a test card. The sensors can detect when the leaf springs are compressed by engaging with the tapers on the test card during insertion, and also detect when the leaf springs recoil back to an extended position to engage with the notches when the test card is fully inserted. The reverse is also true as the latches disengage from the notches during removal of the test card. The information from hall effect sensors regarding the insertion or removal of the test card can be used to determine when to lock and unlock the latches. For example, the moving platform can initially be positioned to unlock the latches during cooling until the previously used test card has been removed, but then move more distal to lock the latches and prevent insertion of a new test card until the heating plates have cooled.

Pneumatic System for Controlling Active Fluidics and Preventing Overflow From Flow Cell Advanced active fluidics are important for precisely controlling metering within flow cells and resuspension and mixing of reagents within the flow cell to perform complex diagnostic tests. Active fluidics can be achieved with internal (self-contained) or external pneumatic systems. While there are potential advantages having the pneumatic system self-contained within a disposable test card, internal systems generally increase the unit cost of disposable test cartridges and can have functional limitations. With an external pneumatic system for active microfluidics, the system should be designed to prevent overflow of the sample fluid volume from the disposable test card into the external pneumatic pumping system on the card reader. It is an object of this invention to disclose an external pneumatic pumping system for active microfluidics that can prevent overflow of the fluid sample.

The disclosed test system, in one embodiment, contains an air manifold assembly that provides a conduit to transmit the pneumatic pressure from the pumps through valves and then to gaskets, which interface directly with small ports on the test card. In one embodiment, the small pneumatic ports lead directly from air channels or conduits that connect to the microfluidic flow cell on the test card. The air manifold assembly houses the pumps, valves, and pressure sensor(s), that form the external active pneumatic pumping system on the device. The pumps and valves are held into position so that they can be face mounted directly to connect with openings on the manifold, and the manifold has internal air channels for the pneumatic system that connect the pumps and valves to the gaskets. The gaskets may be made of a compliant material, such as silicone or rubber. Using silicone has the advantage of temperature and chemical stability. The gaskets are positioned above or below the test card depending on the position of the air manifold within the device, and form seals around each of the small pneumatic ports that make a connection to the microfluidic channels in the test card. The gasket seal is maintained by the force of the moving platform up to, for example, 10 kgs of force or the required force to compress and maintain an airtight seal. The manifold can be made using different manufacturing processes, such as injection molding, CNC milling, or laser cutting.

The external pneumatic system, in one embodiment, terminates at the silicone gasket that are compressed onto the surface of the test card to form a seal around the small pneumatic ports. Therefore, in this embodiment, it is important to prevent the fluid sample from entering into the pneumatic system starting at the point of the gaskets since the external system is not disposable. In order to prevent overflow of the fluid sample on the test card, the fluid sample may be monitored with capacitive sensing, including a fill detect which is a capacitive sensing element at the end of the microfluidic channel that signals that the channel has been completely filled. Once the fill detect senses fluid at the end of an assay channel, in one embodiment, a feedback loop triggers the system to close a valve to shut off the pneumatic system for the port leading to that channel to prevent overflow. The microfluidic flow cell and gasket-sealed pneumatic port holes are connected by narrow air lines or air conduits, which, in one embodiment, are at least 5-fold smaller than the microfluidic flow cell to increase flow resistance. This flow resistance limits the speed of filling of the air lines to give the system time to shut off the pneumatic system before the fluid sample can reach the external gaskets. In some instances, a single pneumatic port could be used to control more than one microfluidic channel within the flow cell. Each of the channels should fill completely before the pneumatic system leading to that port can be shut off, but both channels are unlikely to complete filling at exactly the same time. Therefore, the air lines should be used as overflow chambers so that all channels can complete filling before the pneumatic pumps are shut off without overflowing. For the fastest filling channel, the length of the air lines may be increased to increase flow resistance and overflow volume. Additional overflow chambers can also be included within the air lines to provide more volume for overfilling before the sample reaches the gaskets. Another strategy to prevent overfilling of the channels is to terminate the channel with a hydrophobic sticker, such as an expanded PTFE film, that would allow air, but not liquid, to pass through. PTFE filters can also be incorporated into the external pneumatic system.

Microfluidic Flow Cells Without PSA Film Spacer

A typical diagnostic test containing a microfluidic channel, such as a glucose test strip, is manufactured with three layers: (1) a pressure-sensitive adhesive (PSA) film spacer sandwiched between two flat plastic films, a (2) plastic base film and a (3) plastic top film. A microfluidic channel is formed by cutting a void into the PSA film spacer such that the void in the PSA film serves as a space that is contiguous with a sample inlet port. The depth of the microfluidic channel that forms the flow cell is determined by the thickness of the PSA film spacer. However, there are significant limitations to the use of PSA films to form microfluidic flow cells, especially with increasingly complex test card designs. PSA films are easily stretched and deformed, which can make it difficult to precisely align the film during lamination. This is especially true for highly multiplexed test cards that have many features that should be well aligned between multiple layers. Stretching and deformation of the PSA film can also change the dimensions of the microfluidic channels that they form, which can reduce assay precision and reproducibility. The integrity of features formed by voids in a PSA film can become difficult or even impossible to maintain when a substantial portion of the film is cut away and removed, making it become even more pliable and delicate. For example, many voids in the PSA film would be required to form a complex series of microfluidic channels and also to create apertures for platform connectors. With too many voids, the PSA film itself may simply fall apart during attempted lamination. Additionally, the PSA film should be applied as one fully contiguous film during lamination, and thus features that introduce breaks in the continuity of the PSA film cannot be formed in this manner. For example, small air channels that connect two adjacent microfluidic channels from one flow cell to a single pneumatic port hole would form a non-contiguous island; any PSA film that is no longer contiguous with the rest of the film after die cutting will simply fall apart after its cut. Such a design could only be fabricated using multiple film layers such that additional film layers serve as supports, but not without introducing additional cost and complexity. Each additional layer is another surface that should be aligned accurately and laminated during fabrication. For example, three film layers require two lamination steps, with each introducing a certain amount of misalignment between the layers. Each additional layer requires at least one more lamination step and adds to the misalignment tolerance stack up. It is an object of this invention to disclose test cards for in vitro diagnostics that incorporate microfluidic channels formed into a single unified body or film without a PSA film spacer. Since the microfluidic channels are formed into the plastic body or film, they have good structural integrity. Such test cards can also be fabricated at ultra-high speeds with roll-to-roll processes. It is also an object of this invention to disclose a technique to directly bond the layers of a test card together while preserving the integrity of the seal around the microfluidic channels.

Microfluidic test cards of the disclosed invention, in one embodiment, are formed with a structured top film and a base film without a PSA film spacer. As compared to traditional glucose test strips for which the flow cell is formed by a flat top film laminated to a PSA spacer, the flow cell is formed by a single unified body such that the microfluidic channel voids are formed directly into the structure of the top film. Instead of forming a microfluidic channel from a void in a PSA film spacer, microfluidic channels are formed directly into the structured surface of film. The microfluidic flow cell is completed by laminating the structured top film with the channel voids to a second base film which usually is flat. The channel voids formed into the top film are contiguous with the sample inlet port such that the test card will form a flow cell once laminated to the flat base. The top film can be structured by making an impression during film extrusion in the molten phase or by hot embossing a pattern onto a pre-formed thermoplastic film. Individual structured components may also be formed by injection molding, although processes that produce structured film in rolls are preferred for high-speed fabrication. In addition to microfluidic channel voids, the process of structuring the top film can also be used to form other features, such as ridges or grooves, or to modify the effective contact angle of the channel surfaces by incorporating a pattern onto the plastic surfaces of the flow cell. The flat base layer of the test card is typically a heat-stabilized polyester (PET) film which is optimized as a surface for screen-printing. In other embodiments, the structured top film could be formed additively by printing onto the surface of a flat film to create microfluidic channel voids. Physical structures can be formed on the flat film by UV cured acrylic or other screen-printable inks with different print heights. In other aspects, surface treatments can be implemented to modify surface contact angle and control flow properties similar to how structures, such as ridges or grooves, can modify flow properties.

Microfluidic channel voids can be formed into the surface of a plastic film using various techniques. Extrusion imprinting and hot embossing can form structures directly into a thermoplastic film, including rolls of film for roll-to-roll processes. With embossing, the structures are formed into a preformed film. With extrusion, the structures are formed into the film in the molten phase during the extrusion process. Injection molding can also form structured components by forcing molten plastic from heating plastic resin into a mold. However, components formed by injection molding would not be accessible in rolls. The minimum thickness of components produced by injection molding with high flow resins at this time is typically about 0.5 mm thick. Thinner components can be difficult to injection mold due to high injection forces that would be required to fill the mold. Comparatively, roll films can be extruded in thicknesses as low as 50 microns or less. Thermoplastic polymers used to fabricate the top film should be biocompatible and sometimes optically transparent in the case of test cards that require optical detection. Common biocompatible polymers used for diagnostic test cartridges include polycarbonate and cyclic olefin copolymer. Tritan co-polymer is a newer thermoplastic that is also relatively inert and optically transparent. For extrusion and embossing, the structured film should be formed from a thermoplastic material that has a relatively low working temperature. For embossing, the plastic should also have low shape form memory. PET has a very high working temperature and is not suitable for those techniques of forming as a structured film.

In a typical three-layer microfluidic device, the PSA film serves both as a spacer to form a microfluidic channel void and also as a bonding agent between the top and base films. With a structured film forming the microfluidic channels, the depth of the channels is largely determined by the depth of the imprint into the film, which can be fabricated with high reproducibility. However, the thickness of the layer of bonding agent, if required, between the two films also affects the effective depth of the channels. Optimally, the two films can be bonded with no bonding agent or a very thin layer of bonding agent so as to minimize its impact on the variability of the depth of the channels. The design of the test card should allow for a minimum sealing area of about 250-500 microns around the channels and between the channels and the edge of the card. Any adhesive agent used for lamination and bonding should not interrupt the surface chemistry of the microfluidic channel or interfere with assay chemistry. The adhesive agent should also not obstruct elements of the microfluidic channel or pneumatic system. For example, the narrow air lines that transmit the pneumatic forces from the pneumatic port to the microfluidic channel can be obstructed by even a small amount of adhesive that overflows into the lines during lamination. In some embodiments, the structured top film and base film are like-materials such that the two like-surfaces can be bonded together directly with heat or acoustic energy with no additional bonding medium between them. In other embodiments, a thin layer (5 to 50 microns) of a bonding agent is applied between the two plastic film layers such that it can form a strong bond between the plastic films during lamination. In some aspects, the bonding agent can be screen-printable such that the agent can be applied in a precise manner to avoid overflowing into the microfluidic channel voids or interacting with reagents that may be incompatible. Screen-printing is already used in diagnostics to form other key features on the base layer of the test card, such as assay electrodes and conductive traces. Screen-printing the adhesive on the base layer also guarantees that the narrow air lines will not be obstructed during lamination. In one aspect, the narrow air lines could also be formed additively with screen-printed adhesive applied to a flat surface of film. The bonding agent can be an adhesive, such as a thermoplastic hot melt adhesive, thermoset adhesive, or acrylic adhesive. The adhesive can be applied with screen-printing, or alternatively flood coated or applied with a roller. Less precise application methods can lead to contamination of flow cell surfaces or interaction between the adhesive and incompatible reagents. In some aspects, the adhesive is a biocompatible hot melt encapsulant that can serve both as an adhesive and a dielectric ink. Conductive traces in an electrochemical diagnostic test strips are typically covered by a dielectric ink. But dielectric ink is typically UV cured and cannot be heat reflowed to form a bond between two opposing surfaces. A hot melt encapsulant serving as the dielectric ink can be heat reflowed at relatively low temperatures (60-120° C.), depending on the type of thermoplastic used, and pressure applied to form a bond between the two plastic film surfaces. Screen-printable dielectric is typically formulated to be chemically inert for use in glucose test strips. In other aspects, a screen-printable acrylic adhesive may serve as a bonding agent. The acrylic adhesive is screen-printed onto the base film and then is exposed to UV light to activate it as a pressure sensitive adhesive. This is favorable since it does not require heat for lamination; heat lamination can affect the stability of some assay reagents. Acrylic monomer in UV cured adhesive may or may not be compatible with assay reagents depending on its chemical formulation and application conditions.

With just a thin layer of adhesive forming the bonding medium between the top film and base film, uniform pressure applied during lamination is important for seal integrity between the layers. Furthermore, any surface imperfections or defects of the adhesive layer may lead to additional pressure being required to overcome the non-uniformity or potentially even lead to a failed seal. It was discovered that introducing a pattern of closed or non-contiguous cells on the sealing surface of the film outside of the flow cell could significantly reduce the amount of force that needs to be applied to the bulk of the top film during lamination to create a high integrity seal by reducing the overall sealing surface area and effectively increasing pressure. The cells, in one embodiment, are closed which means they do not communicate with the microfluidic channel and also fluid that may leak unintentionally from the microfluidic channel into a closed cell would not be subsequently flow to adjacent closed cells. The impact of surface defects that cause non-uniformity of the adhesive layer is eliminated by the presence of closed cells covering at least a portion of the sealing area. Adhesive displaced due to a non-uniformity from a defect can occupy the space within a closed cell. Adhesive could also reflow and be displaced by applying high pressures during lamination; the reflowed adhesive can also occupy the space within the closed cells instead of being displaced into the microfluidics channels of the flow cell. In one embodiment, a honeycomb pattern of hexagons was formed across the sealing surface of the top film. The hexagonal pattern interrupts the flat bonding surface and reduces its overall surface area. The cells can serve to isolate sealing defects after lamination and prevent a leak from propagating to the edge of the test card. Each closed cell is an independent area that can seal to contain a leak since fluid cannot flow between the closed cells. The hexagonal shape is the optimal form for a cell since it packs most tightly, but other patterns and shapes could also be used to reduce the required sealing pressure and improve seal integrity. In one embodiment, a structured top film with a complex microfluidic flow cell (80 microns) and a honeycomb pattern of closed hexagon cells outside of the microfluidic flow cell was injection molded and sealed to a polyester base film. High integrity seals could be achieved with both screen-printed dielectric ink and UV cured acrylic adhesive.

Pillars to Prevent Microfluidic Channel Collapse

With the formation of microfluidic channel voids as spaces between a structured top film and flat base film, it is preferable that the channels not be collapsible or otherwise deformable. Variability of channel volume from collapse or deformation would lead directly to problems with assay reproducibility. Furthermore, depending on the type of adhesive used to form a seal, collapsed channels could be permanently sealed closed if the adhesive remains activated and overflows into the channel. It is an object of this invention to disclose a feature that can be formed on the structured top film during processing to maintain the height of the spaces that form the microfluidic channels to prevent collapse.

The collapsibility of the channel voids created by a structured top film and a base film depends on the dimensions of the channels, material properties of the film, and thickness of the film. Channel voids that span a larger surface area and created using thin films with less dense thermoplastics are more likely to collapse or deform from pressure applied by the user, the device, or during the manufacturing process. In particular, channels formed by extrusion imprinting and hot embossing are also more likely to collapse since the fabrication process produces an opposite positive impression on the opposite side of the film. Depending on the material properties of the film, a certain amount of pressure applied over the positive impression can collapse or deform the embossed structure. On the contrary, no positive imprint is formed when the structure of the top film is created by injection molding. In order to prevent collapse of the negative imprint, structural pillars can be formed and strategically positioned within the channels to prevent collapse and maintain channel volume. The pillars can be formed by the same processes that are used to form the structured surface of the film, such as extrusion imprinting, hot embossing, or injection molding. The pillars effectively serve as supports to prevent displacement of the imprinted pattern that can lead to partial or total collapse of the channels. The pillars can have a significant impact on the flow characteristics and resistance to flow within the microfluidic channel; thus, the size and position of the pillars should be optimized for each channel design to achieve proper fluidic performance. Furthermore, areas of a channel that are narrow may not require pillars to maintain their structural integrity since large of forces would be required to cause deformation.

Ridge Traps for Capillary Filaments

A problem with microfluidic channels is the formation of Concus-Finn capillary filaments. Depending on the contact angle and geometry of the flow cell surfaces, Concus-Finn filaments can form at sharp corners at the interface between two plastic films that form a microfluidic channel and cause obstructions in the microfluidic system. It is an object of this invention to disclose design features in a microfluidic test card that can prevent obstructions from the formation and release of such filaments.

Since Concus-Finn capillary filaments form at the interface between the two laminated film layers, a pattern of sharp angled ridges, referred to as ridged filament traps, can be introduced to line the interface between two films to capture Concus-Finn capillary filaments and prevent their spread into narrow areas of the microfluidic device that can easily become obstructed. For example, the narrow air lines that propagate the pressure from the pneumatic system could otherwise easily become blocked and cause complete loss of function of the active fluidics of the test card. Ridged filament traps were completely effective at capturing filaments and preventing loss of fluidic function when filaments formed in the devices tested. Ridged filament traps can be formed with the same process used to structure the top film, such as extrusion imprinting, embossing, or injection molding. The ridges could also be additively printed onto the surface within the channel. The traps are essentially formed by creating a sharp angular repeating pattern at the interface of the two films. The sharp repeating pattern can be a square wave pattern, sawtooth pattern, triangular wave pattern, other irregular sharp pattern, or combination thereof. The repeating pattern of the sharp angular ridges typically should repeat with a pitch of 0.1 to 0.5 mm. The repeats add additional redundancy for capturing capillary filaments. An alternative to the use of structural ridges as traps is to introduce an alternating pattern with surface treatments that modify the contact angle along the interface of the two films. This repeating pattern can have the same effect as the physical ridged traps to capture filaments forming at the interface between the two films of the microfluidic channel.

Microfluidic Weirs to Control Flow of the Fluid Front

If the fluid front of the sample does not advance uniformly across the entire width of a microfluidic channel, an air pocket can form. Non-uniformity of flow across microfluidic channel can be caused by small differences in surface energy that impact the contact angle and wetting properties on the surfaces of the channel. For example, the sample may advance preferentially in areas that are more hydrophilic. It is not uncommon for the fluid sample to advance along the sides of the flow cell preferentially and bypass the center of the flow cell due to differences in surface energy. This can trap air causing a bubble to form in the center of the channel. Differences in surface energy are common, whether they are due to use of different materials, surface defects, scratches, or even pieces of dust. The introduction of air bubbles into a microfluidic channel can impact the accuracy and precision of microfluidic-based tests, especially if the bubbles form over key elements on the test card such as reagent zones or electrodes. They also impact the volume of fluid sample in the channel. It is an object of this invention to disclose features within a microfluidic channel to prevent non-uniform flow.

In one embodiment, the disclosed features formed into surface of the microfluidic channel can control the uniformity of flow of the test sample and prevent the formation of air pockets. Microfluidic weirs or baffles are short repeating elements patterned onto the surface of the flow cell that span across the entire width of the flow cell perpendicular to the direct of flow. The microfluidic weirs create a capillary pressure perpendicular to the direction of flow such that the fluid front preferentially fills the entire width of the channel laterally before the fluid continues to advance forward. Differences in surface energy across the width of the channel that could otherwise cause non-uniformity in forward flow are much smaller than the pressure introduced by the weirs to induce lateral flow. Thus, the channel will fill laterally before the fluid front advances forward from one microfluidic weir to the next. This prevents the formation of air pockets that could impact the performance of the test. In one embodiment, the microfluidic weirs are straight or curved bands or grooves across the width of the flow cell. In some aspects, the bands could be curved to follow the shape of a meniscus of a fluid front. In some embodiments, the bands or grooves can be 5 to 25% of the overall height of the channel which would be sufficient to generate the necessary capillary pressure differential, albeit some effect could still be observed even with band heights of less than 5% of channel height. The weirs are formed in a repeating pattern along the long axis of the channel with a pitch of 50 to 500 microns. The short repeating elements can be formed in the structured layer of the microfluidic channel by injection molding, extrusion imprinting, or embossing. The short repeating elements could also be additively printed onto the surface within the channel before lamination. In other embodiments, the lateral capillary pressure could be created by applying a surface treatment within the channel following in which the surface treatment follows a similar repeating pattern along the long axis of the flow cell. Just as the physical weirs create a capillary pressure leading to preferential filling in the lateral direction to improve flow uniformity, a surface treatment could also create such an effect by modifying surface energy across the width of the channel.

Reagent Zones and Reagent Mixing

Assay reagents are typically dried within the microfluidic channels to be resuspended either by the test sample or buffer fluid from a buffer pack. Reagents should be deposited onto a surface within the microfluidic channel and dried without wetting beyond the area of the channel. During operation of a test, the test sample should flow past the dried reagent cake to resuspend the reagents uniformly and with high reproducibility. It is an object of this invention to disclose reagent deposition zones that constrain the position of the reagents during drying. It is also an object of this invention to disclose a design to improve the uniformity of reagent resuspension.

Test cards in the disclosed system, in one embodiment, contain reagent deposition zones which are typically located upstream from any analytical detection elements of the system, so that dried reagents can be deposited and dried down in position to be resuspended by the test sample as it moves through the microfluidic channel. The reagents are deposited within the reagent zones either directly on the bare plastic surface of the base layer of the channel or on a hydrophilic coated surface so that the reagents will spread out throughout the reagent zone. In one embodiment, the reagent zones are delimited by screen-printed carbon ink, which is a more hydrophobic surface that can constrain the spread of reagents outside of the reagent zone. If a reagent spreads outside of the deposition zone and beyond the area of the channel, there will be less reagent within the channel to be resuspended which can impact the assay. The reagent deposition zones are retained fully within the microfluidic channel to ensure consistency and repeatability of reagent resuspension. In one aspect, any coffee ring effect, in which there is more reagent on the edges of the reagent cake than in the center of the reagent cake, will be retained within the deposition zone inside the microfluidic channel. Each microfluidic channel has a reagent mixing zone and an analysis area which are separated by a narrowing that is referred to as the mixing zone neck. The mixing zone neck is intended to improve the uniformity of reagents in the sample as the entire fluid sample volume moves through this narrow area before entering the wider analysis area, allowing it to be mixed. This helps to prevent non-uniformity across the width of the channel if there are differences in resuspension across the flow cell.

High Resolution Metering With Capacitive Monitoring

A key to providing a high level of performance in an advanced in vitro diagnostic system is high resolution metering, which actively controls the precise position of the test sample within a microfluidic channel. High resolution metering can also control complex actions within a microfluidic channel such as reagent mixing, which requires real-time monitoring of the precise position of the advancing fluid front within a channel to provide feedback to a pneumatic control loop in the test system. It is an object of this invention to disclose a method for precise real-time high-resolution monitoring of the precise location of a fluid sample with forward and backward flow within a microfluidic channel.

High resolution metering in the disclosed test system, in one embodiment, is achieved with control loops based on feedback from a capacitive monitoring system. In one embodiment, capacitive monitoring of a liquid front utilizes a series of capacitive elements that are screen-printed onto the base layer of the test card with silver conductive ink covered by dielectric ink and coupled together to provide discrete capacitive signals as the test sample moves from one capacitive element to the next in the series within the microfluidic channel. Capacitive elements, in one embodiment, are screen-printing first with conductive silver ink followed by a layer of dielectric ink to completely cover the conductive silver element and prevent direct wetting of the conductive ink by the liquid sample. Direct wetting of the conductive ink would otherwise cause a short which does not allow for detection of dynamic wetting and unwetting of the capacitive elements in the series. By encapsulating the conductive ink, the capacitive elements detect both forward and backwards flow (wetting and unwetting) of the test sample across the same capacitive elements in a series, which is required in a closed loop system that can control reagent mixing (back and forth liquid pumping). If the conductive silver ink is exposed anywhere within or outside of the microfluidic channel, it is covered with carbon ink to prevent silver contamination of the fluid sample. In one embodiment, the capacitive elements are interdigitated elements adjacent to at least one reference element. The reference element is charged with a fixed voltage in proximity to at least one capacitive element in the series. In one embodiment, a series of interdigitated capacitive elements are coupled together by conductive traces and form a ladder of capacitive elements. Each interdigitated element in the series forms one rung on the capacitive ladder, and large discrete changes in capacitance are detected as the liquid test samples wets consecutive capacitive elements in the series. The capacitive elements in the series are spaced out adequately, in one embodiment, to allow the meniscus of the moving liquid front to move past only one capacitive element at a time; this is what causes large discrete changes ('jumps') in the capacitive signal as the fluid front moves from one element to the next, instead of a continuous but non-discrete increase in the capacitive signal. The discrete signal makes it possible to clearly distinguish the position of the fluid front as it moves between the rungs on the capacitive ladder. Non-discrete, continuous increases in the capacitive signal would require calibration to determine the relative location of the liquid front, which is not required with discrete changes in signal. A series of capacitive elements is utilized such that the precise position of the test sample can be determined based on its relative position between two adjacent capacitive elements. Higher resolution is achieved by positioning the capacitive elements closer together, but the elements should be separated sufficiently such that the meniscus of the liquid front isn't contacting two elements simultaneously. In one aspect, a short detection element, a conductive silver element that is not covered by dielectric, is positioned at the end of the capacitive ladder such that the capacitive ladder is shorted once the test sample covers all of the capacitive elements in the series plus the last short detection element. The short detection element provides a static signal at least until it is completely dried.

Detecting Previously Used Test Cartridges

Its preferable for diagnostic platforms to be simple and easy to use by untrained users without unexpected errors. This is a requirement in the United States for a diagnostic test on a point-of-care platform to be CLIA waived. Two key sources of error are the accidental reuse of a previously used diagnostic test and application of an inadequate volume of test sample. It is an object of this invention to disclose a method to detect reuse of previously wetted test cards, or test cards with inadequate volume.

The disclosed test system, in one embodiment, uses capacitive elements and short detection elements, carbon conductive ink elements that, unlike capacitive sensing elements, are not covered by dielectric. While capacitive elements provide reversible signals as the fluid sample passes back and forth across the elements, the signal provided upon wetting the short detection elements is semi-permanent. When short detection elements are wetted by the fluid sample, the conductive traces cause a short. Depending on the geometry of the sensor, the short can persist even when the test card is partially dried to allow detection of a previously used test strip. Short detect elements and capacitive sensing elements can also be positioned along the main microfluidic feeder channel to monitor the position of the sample fluid, and prevent the test card from running dry with inadequate volume. If each assay has its own microfluidic channel that is filled from the main feeder channel, the active fluidics can be designed to feed sample volume from the main channel to one assay channel at a time, and to stop filling the assay channels if the main feeder channel runs out of sample volume or has an inadequate volume to completely fill the next assay channel. The goal is to prevent partially filling an assay channel, which would result in an invalid assay. If the metering system can verify that adequate volume is available in the main feeder channel before starting to fill an assay channel, this would prevent partial fill of a channel which invalid an assay result. As long as no test sample has entered a particular channel leading to a partial fill for an assay, additional test sample could be applied subsequently to allow the remaining microfluidic channels to fill to complete the test panel without invalidating individual results.

Referring now to the figures, selected embodiments of the present invention will be described in detail. It should be understood, however, that these embodiments are for illustrative purposes only, and other embodiments exist within the scope of the claims.

Referring to FIG. 1, one embodiment of a small compact point-of-care lab instrument is shown in a perspective view. In this embodiment, the instrument has an external housing 100 such that an assay card 101 is inserted into the instrument through the housing. The portable instrument also has a battery compartment 102 and a display 103.

Referring to FIG. 2A, an embodiment of a point-of-care instrument is again shown with a front view. The front of the external housing comprises a slot 201 for entry of the test card into the card bay. Entry of the test card through the slot is obstructed by the large latch 200 on one side and the small latch 202 on the other side. The front end of the test card must have tapered corners on each side that are larger enough to clear the corresponding latch for the test card to gain entry into the card bay. As seen in a vertical cross section through the instrument in FIG. 2B, the instrument contains a core module 203 which is a self-contained mechanical assembly that accepts the assay card upon insertion through a slot 201 in the external housing and can perform highly multiplexed functions required by an advanced diagnostic platform, a control electronics board 204 that interfaces with both the core module and also the display to control an on-board operating system with a user interface, an optical barcode scanner 205, a cooling fan assembly 206 for cooling the core module during operation, and removable battery 207 that can be replaced within the battery compartment.

Referring to FIG. 3A-3D, an embodiment of a core module is shown in a perspective view, front view, and two horizontal cross sections of different perspectives. The core module is a self-contained assembly of components that form the card bay and moving platform, and also contain the pneumatic system and other analytical components for performing a diagnostic test. The same core module could be incorporated into different external housing designs with or without a display. The components of the core module are assembled together into a structural assembly between a top structural support 300 and bottom structural support 304. The top structural support provides structural integrity for the moving platform, which is formed by two aluminum heating plates 322 and 323 for each of front and rear heating zones, respectively, and a main platform printed circuit board 312 mounted with alignment pins 318, spring connector pins 319, optical LEDs 320, and rear leaf springs 321. The bottom structural support provides structural integrity for the base of the card bay. The base of the card bay is formed by two aluminum heating plates 314 and 316 for each of front and rear heating zones, respectively, which also contain gaskets 315 that connect via conduits to the pneumatic system and optical sensors 317 adjacent to the optical LEDs on the platform above. The platform moves up and down vertically on lead screws 310 on each side powered by left 303 and right 307 motors. The aluminum plates from the platform are coupled to the lead screws via plastic side slides 308 on each side, and there are also guide pins 301 that provide additional support for the moving platform mechanism. The entry into the card bay is partially obstructed by a large latch 200 on the left and small latch 202 on the right. The latches are engaged by tapers on the corners of the test card and are actuated outwards to allow the test card to be inserted. The actuation of the latches can be locked by the latch locks 309. The engagement of latches by the latch locks depends on the position of the moving platform. The locks engage the latches when the platform is in its most distal position, and then disengaged by a latch spring 311 when the platform moves to a less distal position. During insertion of a test card, the test card is biased downward first by a rolling shutter 306 with a leaf spring 302 proximate to the slot entry and subsequently by the rear leaf springs 321. The pneumatic fluidics manifold 305 which houses the pump and valve system is positioned below the card bay and connects to the gaskets through a series of conduits. Finally, the core module assembly interfaces with a ribbon cable from the control electronics board through a connector 313.

Figure 4B:
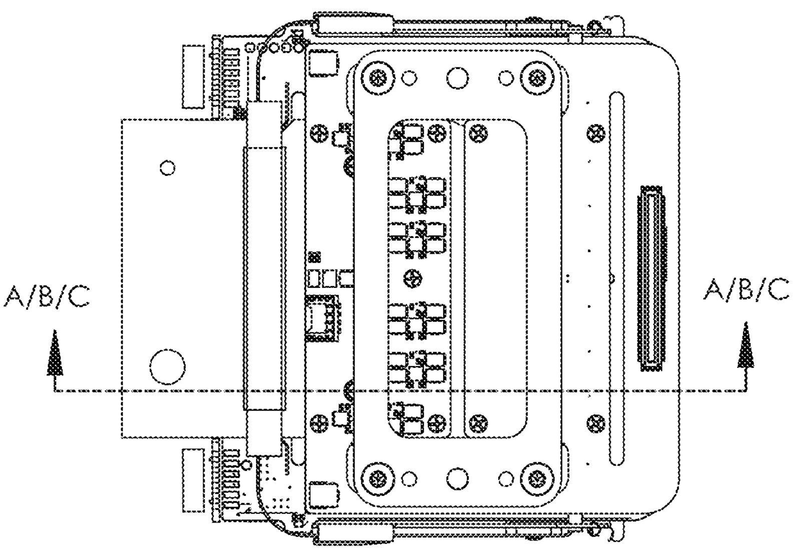
FIG. 4E is a top view of an embodiment of the core module assembly with two independent card interfaces showing the section line for the subsequent vertical cross section.
FIG. 4F is a view of a vertical cross section (Section D-D) through an embodiment of the core module assembly with two independent card interfaces with the platform in a clamped position.
FIG. 4G is a top view of an embodiment of a long assay card that can interface with the rear card interface from a core module assembly with two independent card interfaces.
Figure 4B:
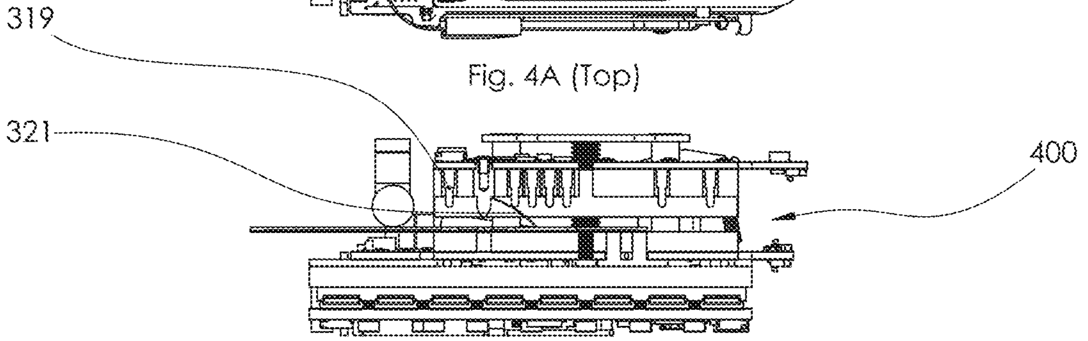
Figure 4C:
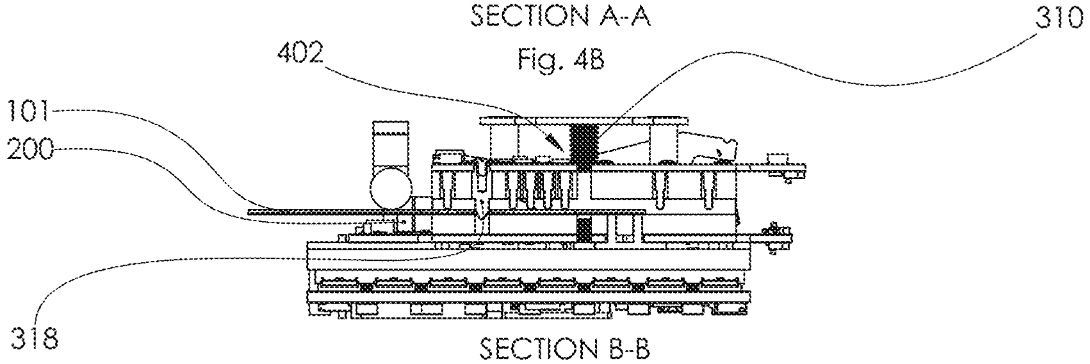
Figure 4D:
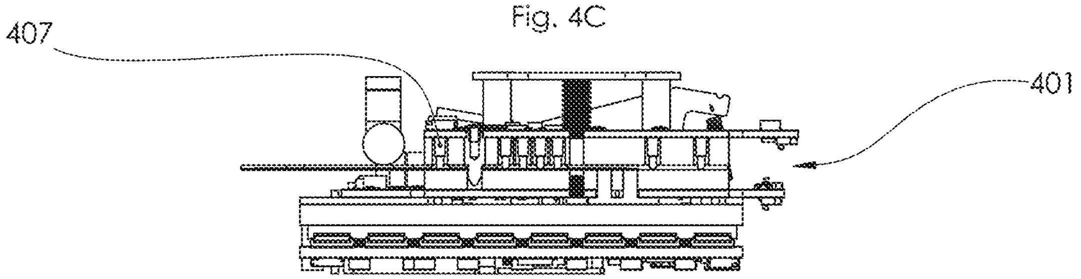

Referring to FIG. 4A-4D, a series of vertical cross section views of one embodiment of a core module assembly demonstrate the dynamic movement of the platform with the alignment pins and spring connector pins engaging a test card within the card bay. In FIG. 4B, the platform remains in a fully distal position after insertion of the test card 101. The latches capture the test card and provide preliminary registration such that the alignment pins 318 on the card interface line up with the alignment holes sufficiently for the conical tips of the alignment pins to engage the alignment holes. In FIG. 4C, the moving platform descends on its lead screws 310 to an intermediate position such that the alignment pins engage the alignment holes and provide fine alignment between the test card and the card interface. In FIG. 4D, the moving platform descends further to a fully clamped or closed position such that the spring connector pins 319 have also engaged the test card and become compressed. The rear leaf spring 321 also compresses and can become flush with the aluminum heating plate when the platform is in the fully clamped position.

Figure 4E:
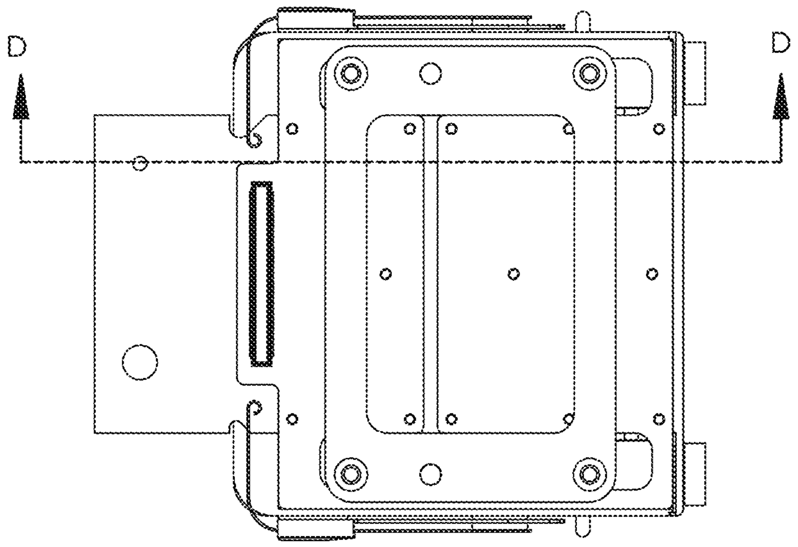
Figure 4F:
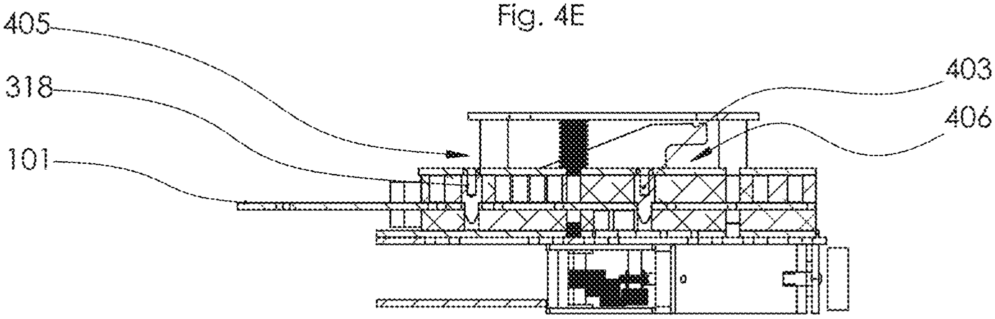
Figure 4G:
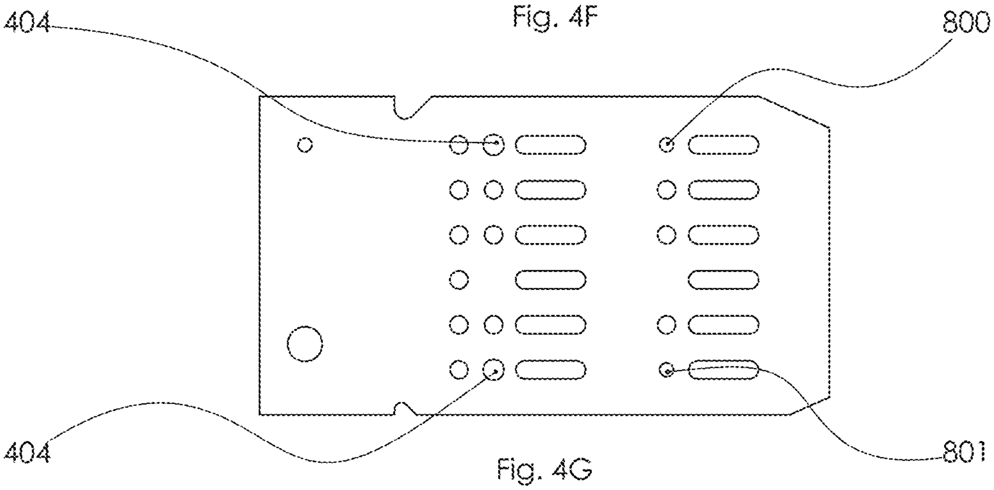

Referring to FIG. 4E-4G, an embodiment of the core module assembly with two independent card interfaces is shown with a long assay card 101. The card interface in the front of the module has alignment pins 318 and the card interface in the rear of the module has alignment pins 403. Depending on the design of the long assay card, the assay card can align to either the front or rear card interface. In the embodiment shown in FIG. 4G, oversized through holes 404 are positioned in line with the alignment pins from the front card interface and alignment holes 800 and 801 are positioned in line with alignment pins from the rear card interface. As such, the alignment holes in the rear of the long assay card will engage the rear alignment pins as the card interface actuates down into the clamped position. On the contrary, there will be no engagement between the oversized through holes and the alignment pins in the front card interface.

Figure 5A:
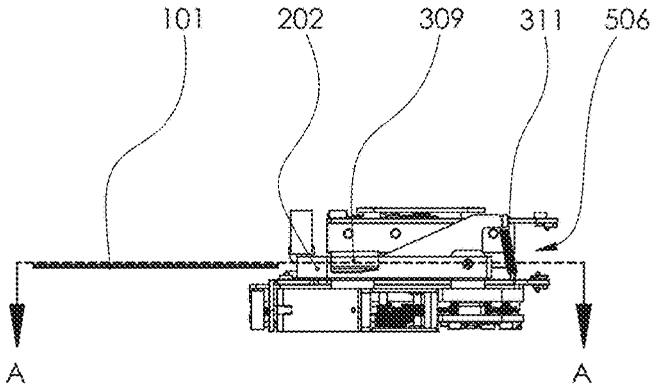
FIG. 5A is a side view of one embodiment of the core module assembly showing the latches in a locked position not ready to accept insertion of the test card.
Figure 5B:
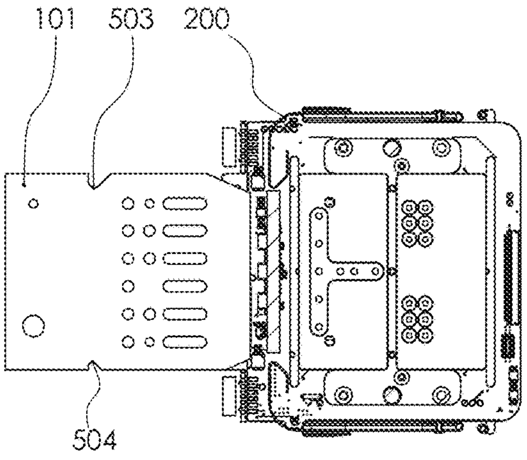
FIG. 5B is a view of a horizontal cross section (Section A-A) through one embodiment of the core module assembly showing latches locked and obstructing insertion of the test card.
Figure 5C:
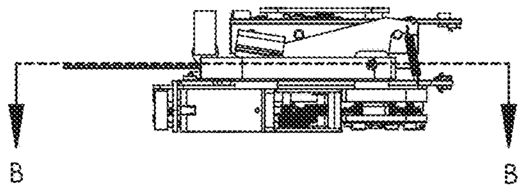
FIG. 5C is a side view of one embodiment of the core module assembly showing latches unlocked and the test card partially inserted.
Figure 5D:
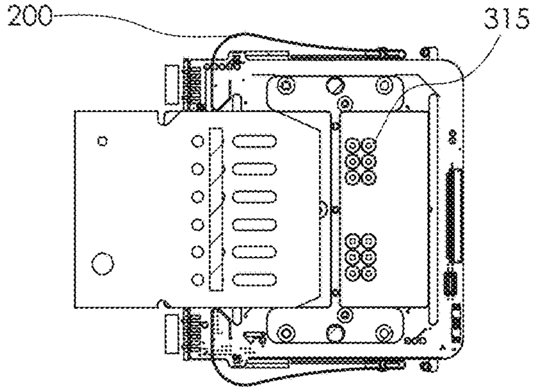
FIG. 5D is a view of a horizontal cross section (Section B-B) through one embodiment of the core module assembly showing latches actuating outward to engage a partially inserted test card.
Figure 5E:
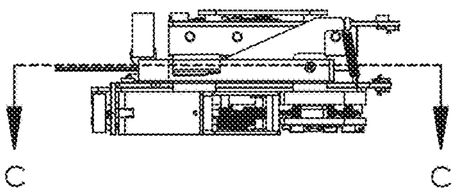
FIG. 5E is a side view of one embodiment of the core module assembly showing latches unlocked and the test card fully inserted.
Figure 5F:
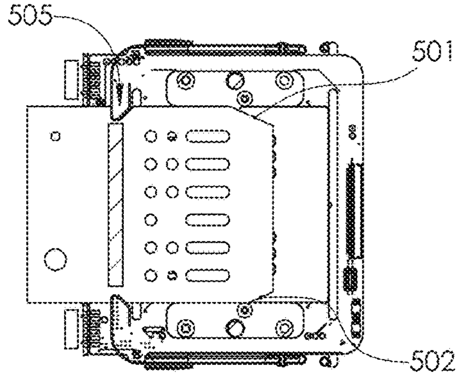
FIG. 5F is a view of a horizontal cross section (Section C-C) through one embodiment of the core module assembly showing latches capturing a fully inserted test card via its notches.

Referring to FIG. 5A-5F, a series of side views and corresponding horizontal cross sections of an embodiment of the core module assembly demonstrate the insertion and capture of a test card within the card bay by the latching system. In FIG. 5A and 5B, the test card 101 is external to the instrument and ready to be inserted, but the large latch 200 and small latch 202 are locked into position by the latch locks 309. Thus, the latches cannot actuate outward and the test card cannot be inserted. The latch locks are engaged by a levering action when the moving platform is in its most distal position. In FIG. 5C and 5D, the latch locks have been disengaged from the latches by the latch spring 311 with the moving platform in a less distal position. The front end of the test card is inserted first with the large taper 501 on the left corner and small taper on the right corner clearing the latches and displacing them outward. The outwardly displaced latches can glide along the side edges of the test card until it is fully inserted. In FIG. 5E and 5F, the test card is fully inserted such that the latches actuate inward to engage the notches and capture the card in position. The large latch engages a large notch 503 and the small latch engages a small notch 504. The test card is captured in a predetermined position such that the test card is preliminarily aligned within the card bay. For example, the test card covers the gaskets in the base of the card bay. However, fine alignment is subsequently achieved by the alignment pins and alignment holes.

Figure 6A:
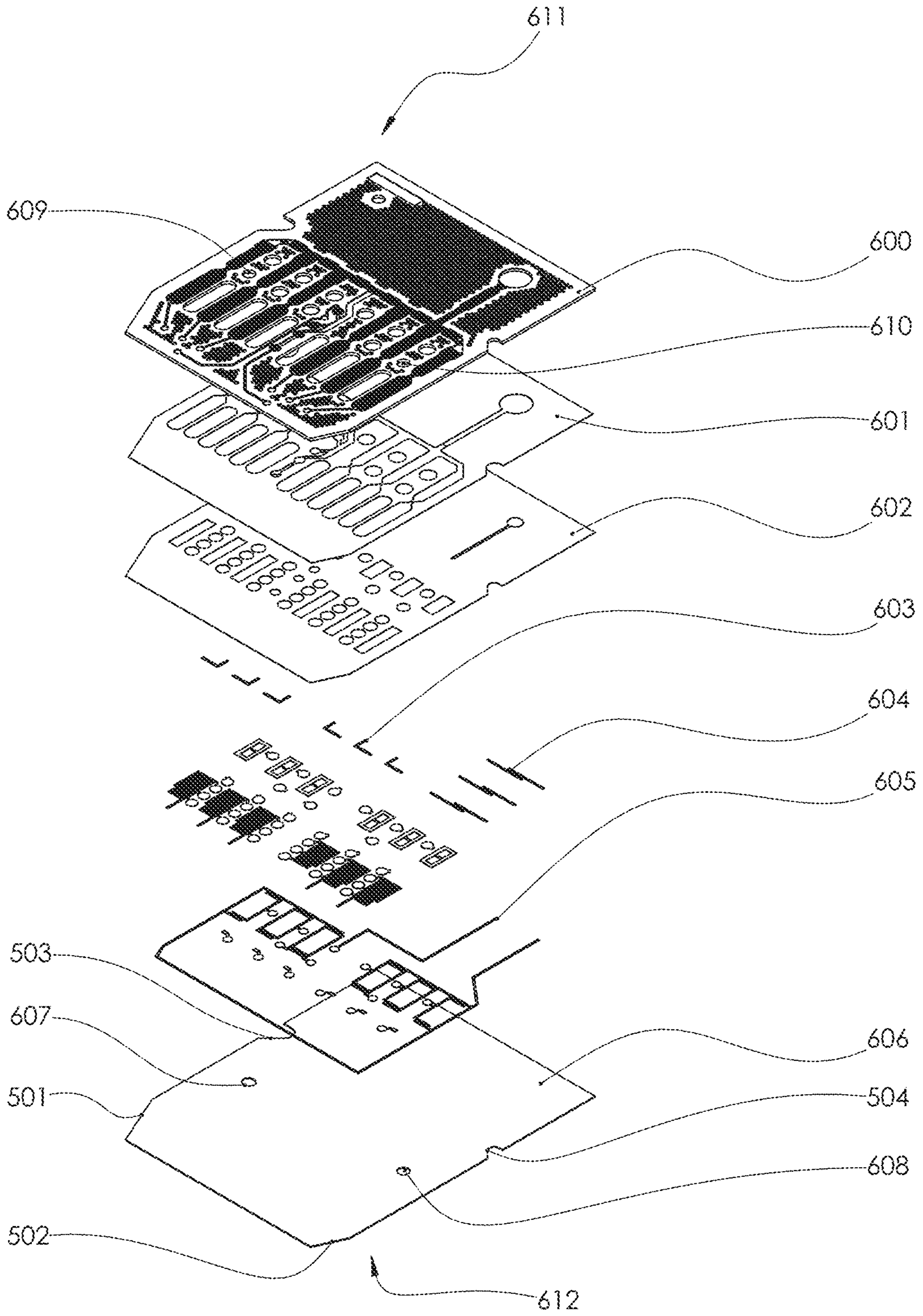
FIG. 6A is an exploded view of one embodiment of a microfluidic test card showing its individual layers.

Referring to FIG. 6, an exploded view of an embodiment of a microfluidic test card for the proposed platform showing each of its layers and corresponding features. The test card is formed with a structured top film 600 and base film 606, and sealed adhesively with screen-printed acrylic 601. Other elements on the base of the test card are formed by screen-printed silver 605, carbon 604, silver chloride 603, and dielectric ink 602. The test card also has large 503 and small 504 notches, large 501 and small 502 tapers, and alignment holes. There is one alignment hole that is round 608 and one alignment hole that is elongated in one dimension 607.

Figure 6B:
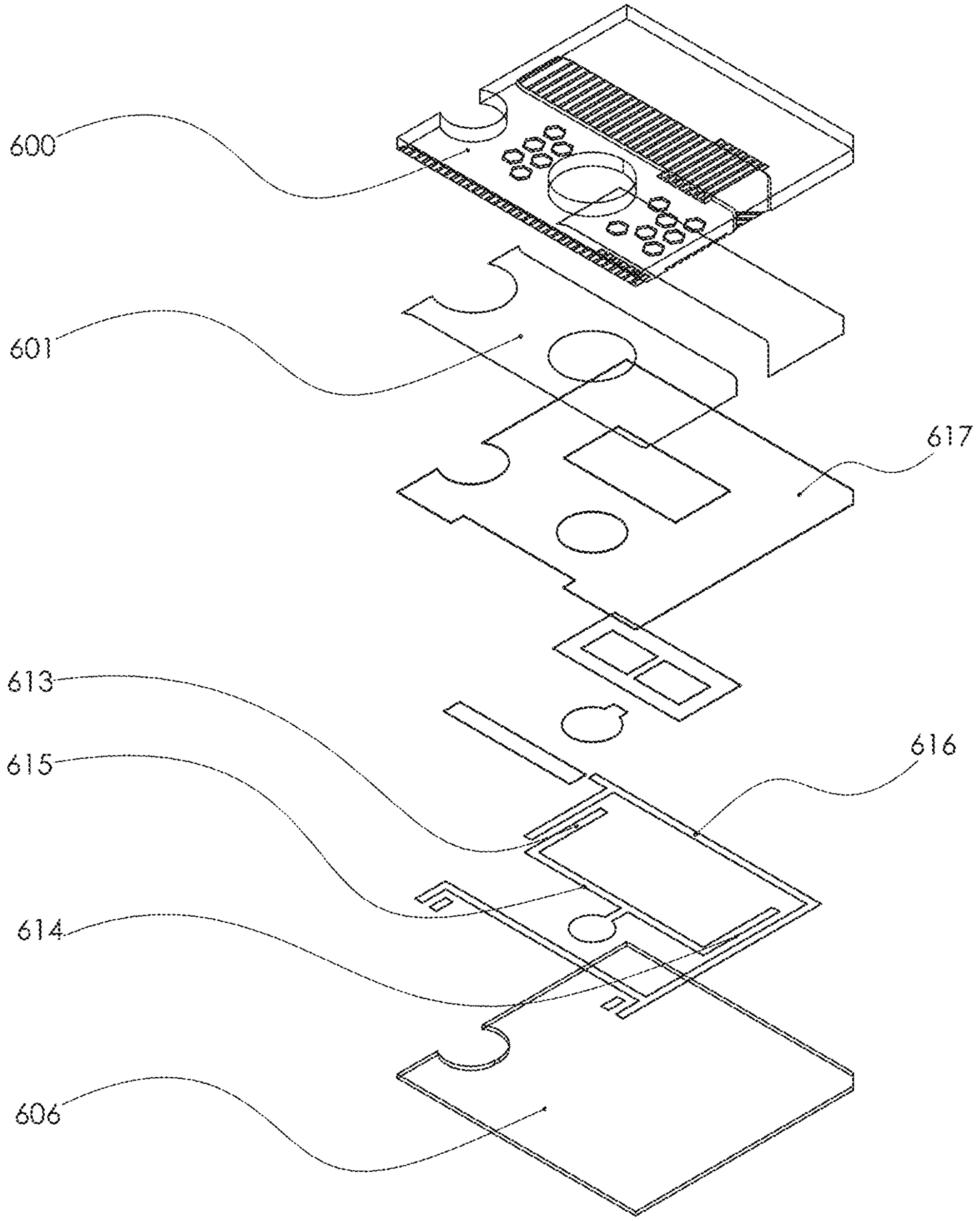
FIG. 6B is a magnification of the exploded view of one embodiment of a microfluidic test card showing its individual layers cropped to focus on a series of interdigitated capacitive elements.

Referring to FIG. 6B, two consecutive silver conductive elements 613 and 614 are shown in a within a microfluidic channel. The conductive elements are connected by a conductive trace 615 outside of the microfluidic channel, and the conductive elements are also in close proximity to a single interdigitated reference element 616. The conductive elements are covered by dielectric 617 within the microfluidic channel. This ensures the capacitive elements do not come into contact with the fluid sample directly.

Figure 7:
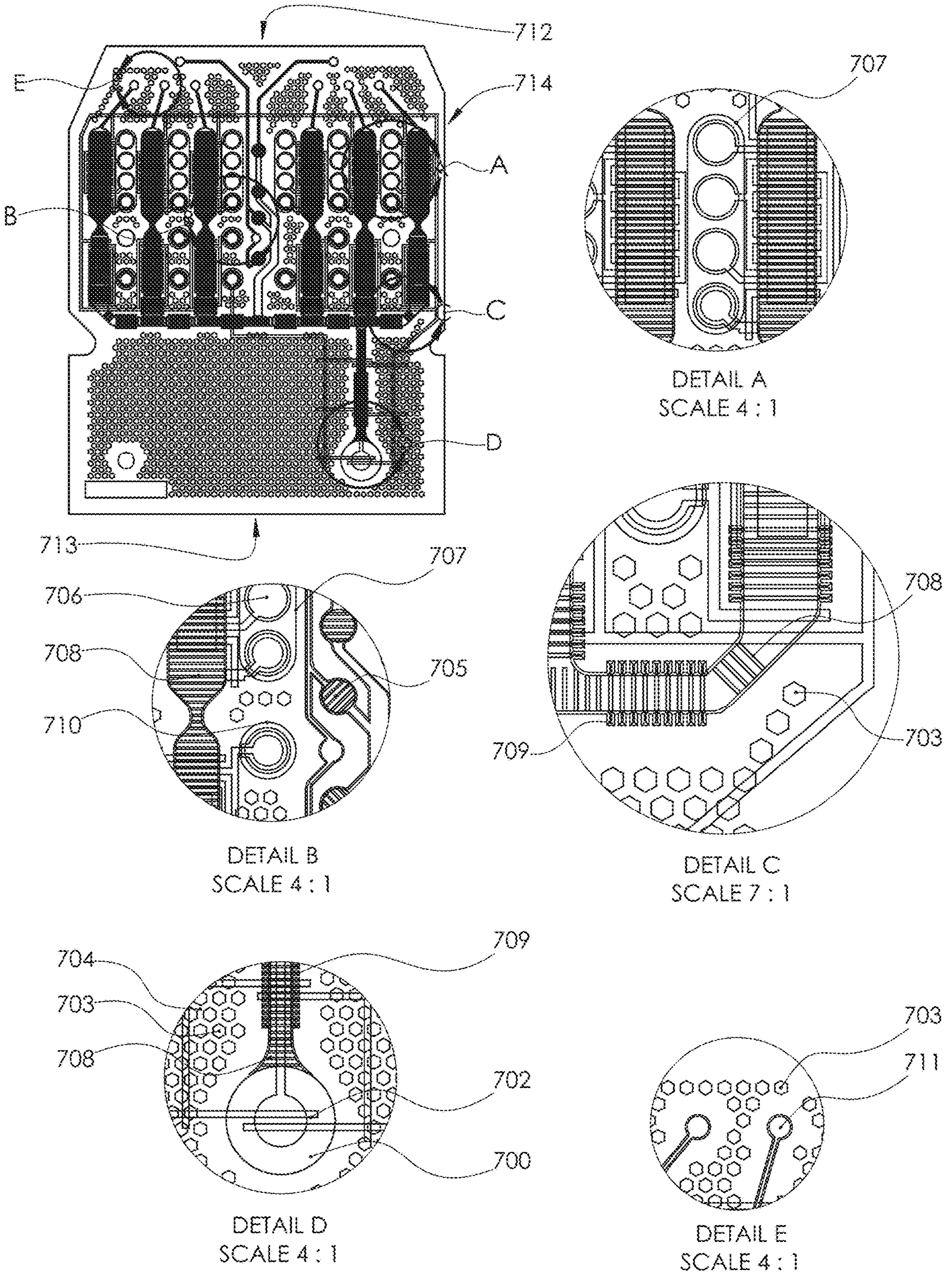
FIG. 7 is a top view of one embodiment of a microfluidic test card with magnification of key features.
Figure 8A:
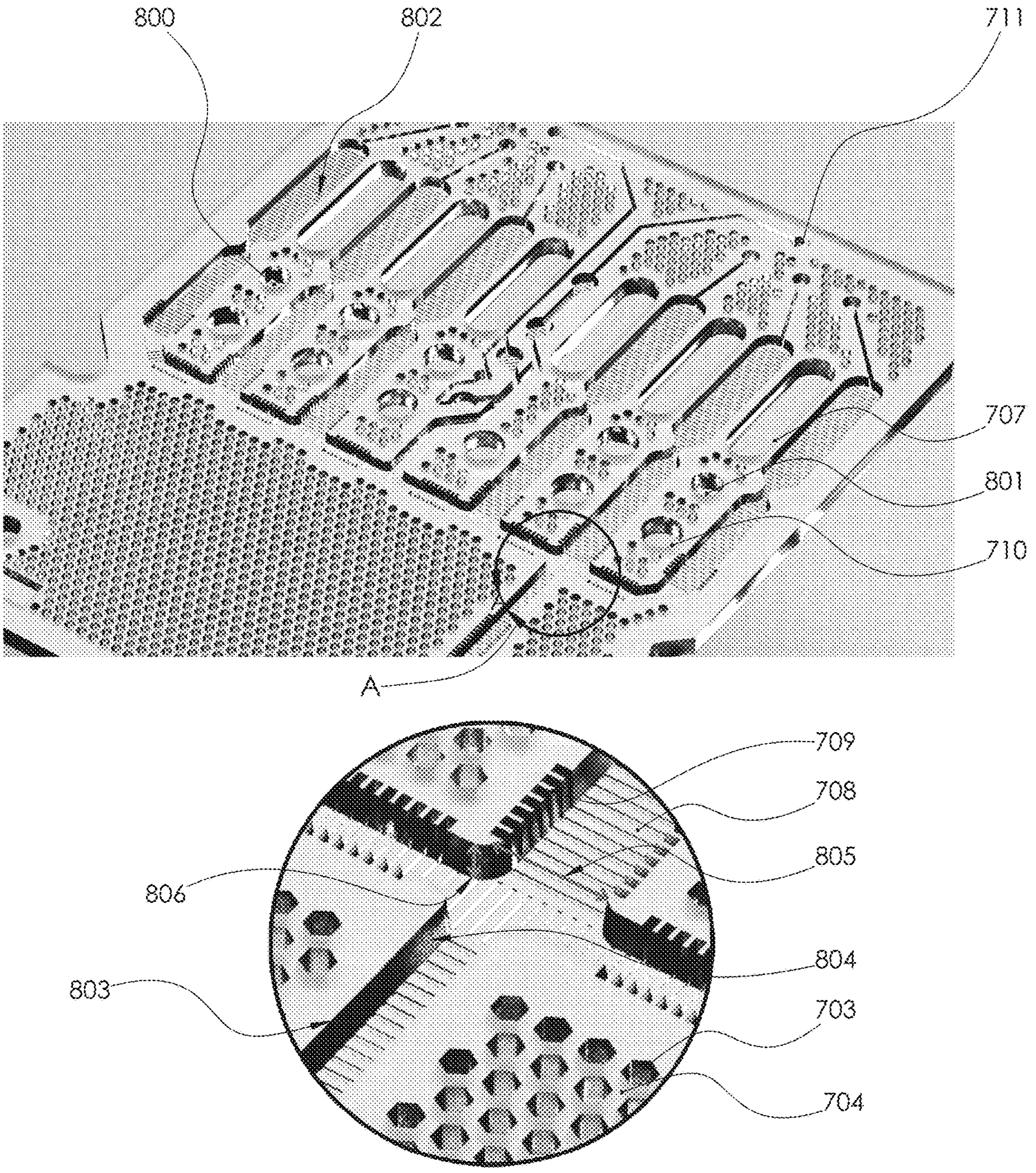
FIG. 8A is a perspective view of one embodiment of a microfluidic test card with magnification of key features.
Figure 8B:
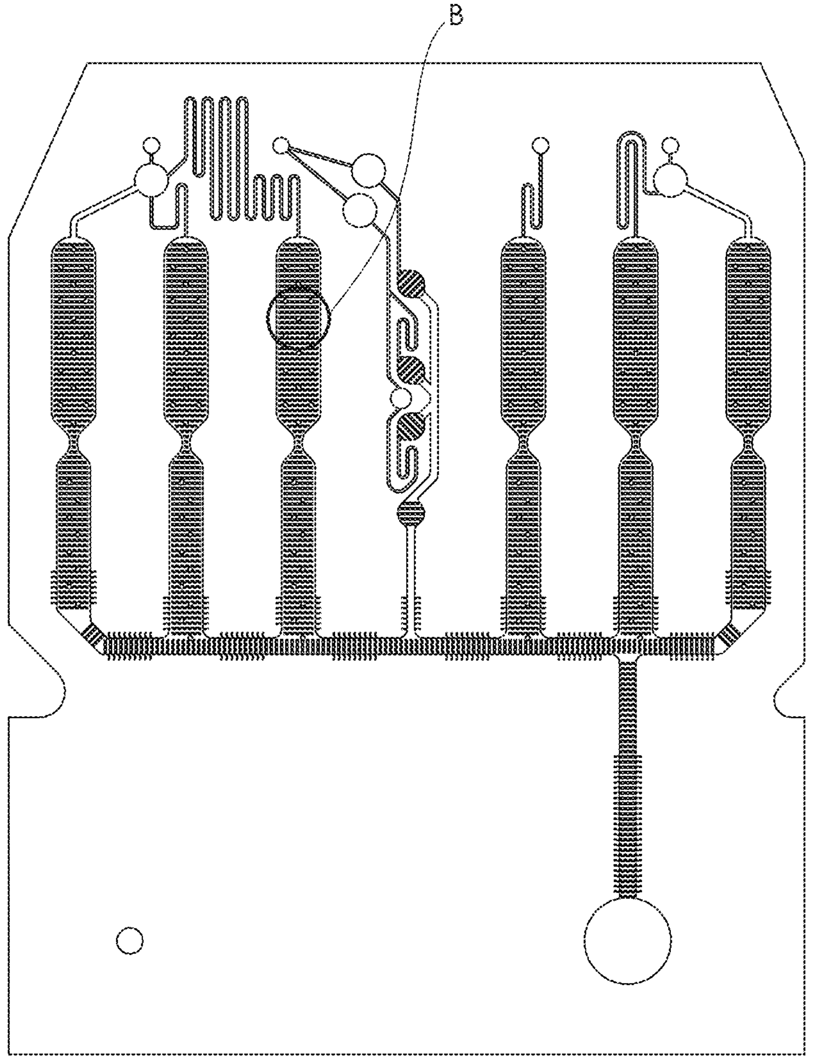
FIG. 8B is a top view of one embodiment of a microfluidic test card with channels supports with magnification to highlight the channel support feature
Figure 8B:
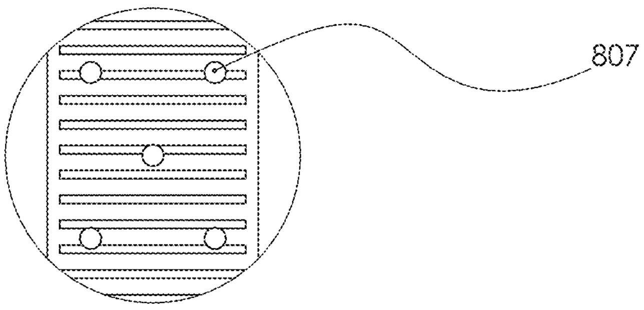

Referring to FIGS. 7 and 8, an embodiment of a microfluidic test card is shown from a top view and perspective view, respectively, with magnification of key features. The test card has a sample inlet port 700 for application of a test sample into the microfluidic channel. Sample application can be detected immediately by a short detection element 702 just below the inlet port. At the end of each microfluidic channel is a gasketed port 711. During a test, a gasket from the test system seals around the gasketed port to connect the external pneumatic system to the microfluidic channel on the test card. The microfluidic channels also contain structural weirs 708 to prevent the formation of air pockets and ridged filament traps 709 to capture capillary filaments that could otherwise obstruct the microfluidic system. In certain areas, optical apertures 705 align with optical sensors and optical LEDs on the instrument platform. Optical apertures also contain weirs to prevent the formation of air pockets within the optical aperture. A honeycomb of closed hexagon cells 703 separated by cell walls 704 cover the sealing surfaces of the microfluidic test card outside of the microfluidic channel. The closed cells reduce the surface area for sealing and prevent leaks. Card contact pads 706 on the base of the test card form island contacts for making electrical connections with the card interface on the instrument. Apertures or holes overlay the card contacts such that the spring connector pins on the card interface contact the card contact pads through the apertures. In some areas, an individual aperture 710 provides access to just one individual contact pad. In other areas, multi-contact apertures 707 can provide access to multiple adjacent contact pads. In one embodiment, test cards also contain two alignment holes, one that has a round shape 608 and one that has an elongated shape 607.

Referring to FIG. 8B, an embodiment of a microfluidic test card is shown with channel supports 807 within the microfluidic channel. The microfluidic channel supports are spaced out to prevent deformation or collapse of the microfluidic channel while also not impeding flow properties of the channel.

Referring to FIG. 9, heating and cooling times were tested. After heating the temperature zone to 95° C. and then starting to cool, the temperature zone cooled to 37° C. as much as 45% faster when the moving platform was in an open position with the top heating plate distal to the bottom heating plate to allow maximum air flow between the plates compared to having the moving platform in its clamped state with no space between the top and bottom plates.

Figure 10A:
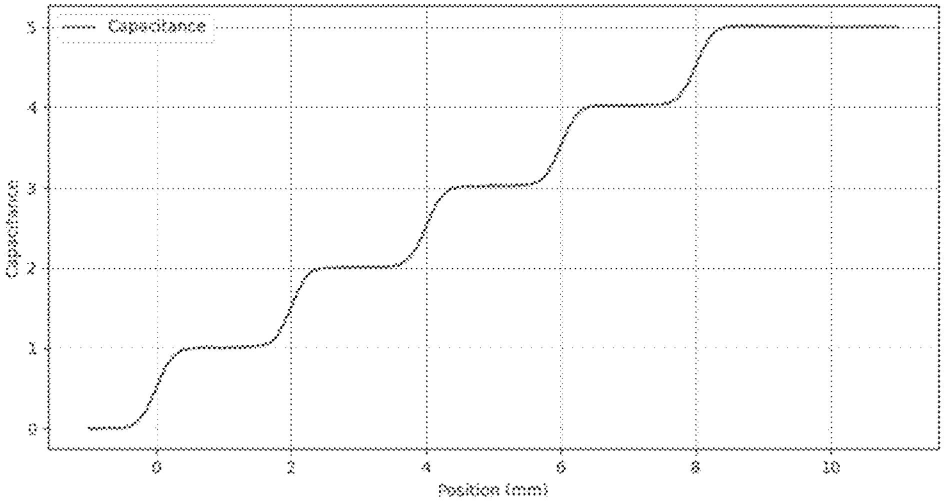
FIG. 10A is a graph showing an example of capacitive responses from a test sample advancing across a series of consecutive capacitive elements.
Figure 10B:
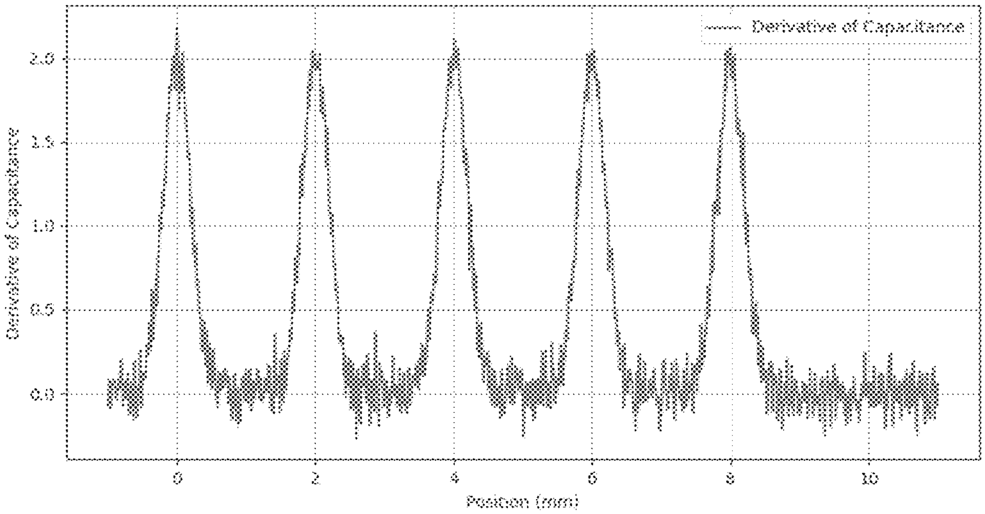
FIG. 10B is a graph showing an example of derivatives of the capacitive responses from a test sample advancing across a series of consecutive capacitive elements.
Figure 10C:
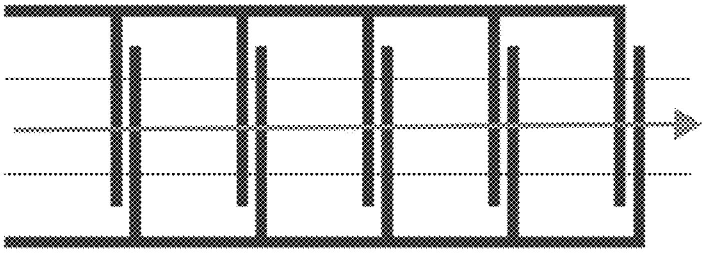
FIG. 10C is an example of a test sample advancing in a microfluidic channel across a series consecutive interdigitated capacitive elements.

Referring to FIG. 10, a series of 5 consecutive capacitive elements is shown within a microfluidic channel and interdigitated with a reference element. As the test sample advances across each of 5 consecutive capacitive elements, a further increase in capacitance is observed which corresponds to a discrete signal when monitoring the corresponding derivative of capacitance. The position of the fluid sample can be determined based on the discrete signals which indicate that the fluid front is between two of the capacitive elements. Therefore, the resolution of the position monitoring depends on how close the capacitive elements are to each other.

Accordingly, one aspect of the present invention is a card reading system 104 in which electrical contacts between the assay card 101and the card reader 104 are made through vertical actuation of a card interface relative to the assay card. In one embodiment, the assay card reading system comprises: (a) a card reader comprising at least one card interface 325, the card interface having a plurality of card interface contacts 319; (b) an assay card having card contacts 706; (c) a vertical actuation mechanism 402 for causing relative vertical movement between the assay card and the card interface to contact at least a portion of the card interface contacts with the card contacts. In one embodiment, the vertical actuation mechanism is connected to the card interface and actuates the card interface vertically.

In one embodiment the assay card reading system comprises: (a) a card reader comprising at least, (i) a card bay 324 for receiving an assay card; (ii) a least one card interface positioned either above or below the card bay and configured to move vertically, the card interface having a plurality of card interface contacts, the card interface having at least two states, a first state 400 in which the card interface is distal from the card bay allowing an assay card to be received in the card bay, and a second state 401 in which one or more card interface contacts of the card interface are in contact with an assay card; (b) an assay card having card contacts, wherein, when the card interface is in the second state, at least a portion of the card interface contacts contact the card contacts.

In one embodiment, no contact is made between the card interface contacts and the card contacts when the assay card is inserted into the card bay. In one embodiment, no electronic connection is made between the assay card reader and the assay card via a card-edge connector.

In one embodiment, the assay card reader comprises a housing 100 defining a slot 201 for providing access to the card bay.

In one embodiment, the assay card comprises at least a first layer 600 and a second layer 606, wherein the card contacts are disposed on the second layer, and wherein a plurality of apertures 710 in the first layer provide access to the card contacts. In one embodiment, in the second position, at least a portion of the card interface connectors pass through apertures in one layer of the assay card to contact the card contacts. In one embodiment, the first layer faces upward when the assay card is in the card bay.

In one embodiment, the card interface further comprises two or more alignment pins 318 which are received in two or more alignment holes 800 and 801 in the assay card in the second state. In one embodiment, the alignment pins are conical. In one embodiment, the assay card comprises at least a first layer and a second layer, and wherein each of the alignment holes comprises a first layer alignment hole 609 and 610 in the first layer and a second layer alignment hole 607 and 608 in the second layer, wherein the first layer alignment hole and second layer alignment hole are positioned as to create a through hole, and wherein the first layer alignment hole is larger than the second layer alignment hole. In one embodiment, a first alignment pin 318 of the alignment pins corresponds to a first alignment hole 801 of the alignment holes, and a second alignment pin 326 of the alignment pins corresponds to a second alignment hole 800 of the alignment holes, wherein the first alignment pin and alignment hole prevent relative movement between the card interface and the assay card in two dimensions, and wherein the second alignment pin and alignment hole prevent relative movement between the card interface and the assay card only in one dimension. In one embodiment, the first alignment pin and first alignment hole are round and wherein the second alignment pin is round and the second alignment hole is elongated in one dimension.

In one embodiment, the assay card comprises at least a first layer and a second layer, wherein the card contacts are disposed on the second layer, wherein a plurality of apertures in the first layer provide access to the card contacts, and wherein a close tolerance fit between the alignment pins and alignment holes positionally registers the card interface connectors to the card contacts such that the card interface contacts pass through apertures in the assay card and contact the card contacts.

In one embodiment, the card interface contacts are biased pin connectors, such as spring pin connectors 319. In one embodiment, the card contacts are conductive pads 706. In one embodiment, the card contacts are island contacts. Island-type contacts are small, isolated regions of conductive material that make electrical contact with other contacts and are typically surrounded by an insulating material to isolate them from other parts of the device. In one embodiment, the conductive pads are screen-printed.

In one embodiment, the card interface comprises a heating element 314, 316, 322, 323 such that, when the card interface is in the second state, the heating plate controls temperature in the card bay. In one embodiment, the assay card reader comprises one or more pumps 305, and wherein the assay card comprises microfluidic channels 802 having one or more gasketed ports 711, and wherein the card interface compresses against the assay card in the second state to seal the gasketed ports to pressurize or depressurize the microfluidic channels using the one or more pumps.

Another aspect of the invention is an assay card reader. In one embodiment, the card reader comprises: (a) a housing 100; (b) a card bay at least partially within the housing; and (c) electrical contacts, the electrical contacts being actuatable and having at least two states, a first state for receiving an assay card in a card bay wherein the electrical contacts do not make an electrical connection with the assay card, and a second state in which the electrical contacts are actuated to make an electrical connection with the assay card in the card bay. In one embodiment, the card reader further comprises a card interface comprising at least the electrical contacts.

Another aspect of the invention is an assay card. In one embodiment, the assay card comprises: (a) a base 606 having a planar surface; (b) card contacts on the planar surface; and (c) a microfluidic channel 802 in or on the base.

Another aspect of the invention is a method of analyzing a sample using a card reader having electrical contacts, the electrical contacts being actuatable and having at least a first state and a second state. In one embodiment, the method comprises: (a) depositing a sample on an assay card; (b) while the electrical contacts are in the first state, receiving an assay card; (c) actuating the electrical contacts into a second state, whereby the electrical contacts make an electrical connection with island contacts of the assay card; (d) analyzing the sample; and outputting results of the analysis. In one embodiment, step (a) is performed before step (b). In one embodiment, step (c) is performed before step (a).

Accordingly, one aspect of the present invention is an assay card reading system having a two-step alignment configuration. In one embodiment, the assay card reading system comprises: (a) an assay card 101 having a top side 611, a bottom side 612, and one or more edges 712, 713, 714, and comprising at least, (i) one or more first alignment fiducials 503 and 504 on at least one of the edges; (ii) one or more second alignment fiducials 800 and 801 on the top side or the bottom side; and (b) a card reader comprising at least, (i) a card bay for receiving an assay card; (ii) one or more first fiducial cooperating members 200 and 202 along at least one side of the card bay to engage the first fiducials and provide initial alignment of the assay card in the card bay; and (iii) at least one card interface above and/or below the card bay, the card interface comprising one or more second fiducial cooperating members 318 and 326, and the card interface having at least two states, a first state in which the card interface is distal from the card bay allowing an assay card to be received in the card bay, and a second state in which the second fiducial cooperating members engage the second fiducials on the assay card, to provide final alignment of the assay card relative to the card interface. In one embodiment, there is compliance between the fit of the first fiducials and the first fiducial cooperating members to allow relative movement therebetween during final alignment of assay card by second fiducials and second fiducial cooperating members. In one embodiment, final alignment is not dependent on registration between a registration surface of the assay card and a registration surface of the card bay.

In one embodiment, connectors on the card interface and contact pads on the assay card align during final alignment. In one embodiment, optical detectors 317 and/or optical light sources 320 on the card interface and optical apertures 705 on the assay card align during final alignment.

In one embodiment, the first alignment fiducials are only on one or more side edges of the assay card. In one embodiment, the first fiducials are on both side edges of the assay card. In one embodiment, the first fiducials and the first fiducial cooperating members are notches 503 and 504 and latches 200 and 202. In one embodiment, the first fiducials are notches and the first fiducial cooperating members are latches. In one embodiment, the second fiducials and the second fiducial cooperating members are alignment pins 318 and 326 and alignment holes 800 and 801. In one embodiment, the second fiducials are alignment holes and the second fiducial cooperating members are alignment pins.

In one embodiment, at least part of the alignment pins is conical 318 and 326 and the assay card comprises a first layer and a second layer, wherein alignment holes on the first layer 609 and 610 are larger than alignment holes on the second layer 607 and 608.

In one embodiment, the card bay has an x, y, and z orientation, and wherein, in the initial alignment, the assay card is aligned with the card bay along the X and Y axes 327 and 328. In one embodiment, initial alignment of the assay card by the first fiducials and the first fiducial cooperating members along the x and y axes allows engagement between the second fiducials and the second fiducial cooperating members. In one embodiment, initial alignment of the assay card by the first fiducials and the first fiducial cooperating members along the x and y axes allows engagement of the alignment pins on the card interface into the alignment holes on the assay card. In one embodiment, initial alignment of the assay card aligns the second fiducials and the second fiducial cooperating members along the x and y axes within 1 mm. In one embodiment, final alignment of the assay card by the second fiducials and the second fiducial cooperating members aligns the card interface and the assay card along the x and y axes within at least 0.5 mm. In one embodiment, final alignment of the assay card by the second fiducials and the second fiducial cooperating members along the x and y axes aligns connectors on the card interface with contact pads on the assay card. In one embodiment, final alignment of the assay card by the second fiducials and the second fiducial cooperating members along the x and y axes aligns optical detectors and/or light sources on the card interface with optical apertures on the assay card.

In one embodiment, the assay card is received in the card bay through a slot to engage the first fiducials with the first fiducial cooperating members.

In one embodiment, the card reader comprises at least one or more resilient members 321 that bias the assay card up or down to remain against the surface of the card bay such that the second fiducial cooperating members on the card interface can disengage from the second fiducials on the assay card as the card interface moves from the second state back to the first state to allow the assay card to be removed from the card bay. In one embodiment, the resilient members bias the assay card up or down such that the alignment pins on the card interface disengage from the alignment holes on the assay card. In one embodiment, the resilient members are leaf springs 321.

In one embodiment, the at least one card interface comprises two or more card interfaces 405 and 406, each of the card interfaces having independent second fiducial cooperating members to align with the assay card independent of the other card interfaces. In one embodiment, the assay card has second fiducials that correspond to a particular one 800 and 801 of the card interfaces and oversized through holes 404 that correspond to all other of the card interfaces such that only one of the card interfaces aligns with the assay card. In one embodiment, the assay card has a plurality of sets of second fiducials, each set corresponding to a particular one of the card interfaces. In one embodiment, the second fiducials are alignment holes, each the set of alignment holes being sized differently. In one embodiment, one of the card interfaces is above the card bay and one of the card interfaces is below the card bay.

Accordingly, another aspect of the invention is an assay card reading system which prevents improper insertion of a test card, accommodates cards of variable thickness and length, and/or synergistically holds down and ejects cards. In one embodiment, the assay card reading system comprises: (a) an assay card having sides and at least one first component 503 and 504 of an interengagement mechanism 505 along one of the sides; (b) a card reader comprising at least, (i) a card bay for receiving an assay card; (ii) a second component 200 and 202 of the interengagement mechanism 505 for interengaging with the first component to hold the assay card in a predetermined position within the card bay, wherein the assay is positioned in the predetermined position by the interengagement mechanism and not by a register surface.

In one embodiment, the interengagement mechanism is at least one of latches/catches, cantilever snap fits, detents, key and slot, or magnetic interengagement. In one embodiment, the interengagement mechanism is latches/catches 200, 202, 503, 504. In one embodiment, the first component is a catch and the second component is a latch 200 and 202. In one embodiment, the latch is a leaf spring 200 and 202 that engages the catch. In one embodiment, the catch is a notch 504 and 504. In one embodiment, the first component is a hole, and the second component is a spring-loaded pin that interengages the hole.

In one embodiment, the assay card is one of a family of assay cards of varying lengths, each assay card of the family having a first component on a side of the assay card such that the predetermined position is defined by an interengagement of the first and second components. In one embodiment, each assay card of the family comprises at least one alignment fiducial 800 and 801, the fiducial being the same distance from the first component along an axis of insertion 328 for each assay card of the family. In one embodiment, the assay cards of the family having a length of 20 to 150 mm, 40 to 100 mm, or 50 to 75 mm and are held at the same predetermined position relative to position of the first component.

In one embodiment, the interengagement by the first and second components provides initial alignment of the assay card in the card bay. In one embodiment, the second component is actuated to engage the first component.

In one embodiment, actuation is monitored by one or more sensors 329 to detect insertion or withdraw of the assay card.

In one embodiment, locks 309 prevent actuation of the second components. In one embodiment, the assay card reader also comprises a card interface above or below the card bay that is coupled to the lock, and wherein the card interface is configured to move vertically relative to the card bay such that the vertical position of the card reader determines whether the locks are engaged with or disengaged from the second components.

In one embodiment, the first component comprises a first component on each side of the assay card, and the at least one second component comprises two second components, each of which is located on different sides of the assay card in the card bay.

In one embodiment, the card reader comprises at least one or more resilient members 321 that bias the assay card up or down to register the assay card in a certain vertical position in the card bay. In one embodiment, the resilient members are leaf springs 321.

In one embodiment, the assay card has a front edge 712 with a polarity allowing the assay card to be inserted into the card bay in only one orientation. In one embodiment, the assay card reader has obstructions 200 and 202 preventing the front edge from being inserted into the card bay. In one embodiment, the front edge has a geometry that clears the obstructions and a back edge with a different geometry that does not clear the obstructions. In one embodiment, the geometry of the front edge is asymmetrical allowing one side to clear an obstruction but not the other side. In one embodiment, each corner of the front edge has a different sized taper 501 and 502 to clear different sized obstructions.

In one embodiment, the obstructions are fixed obstructions or displaceable obstructions. In one embodiment, the displaceable obstructions are the second components. In one embodiment, during insertion of the assay card, the second components are contacted by the tapered corners of the assay card and are displaced in the direction away from the card bay to allow clearance of the front edge of the assay card, and then actuate back towards the card bay to engage the catches upon complete insertion of the assay card.

In one embodiment, one or more locks 309 prevent displacement of the second components. In one embodiment, the assay card reader also comprises a card interface above or below the card bay that is coupled to the locks, and wherein the card interface is configured to move vertically relative to the card bay such that the vertical position of the card reader determines whether the locks are engaged with or disengaged from the second components.

In one embodiment, the assay card comprises at least one alignment fiducial, the alignment fiducial being a certain distance from the first component along an axis of insertion.

Accordingly, one aspect of the invention is an assay card reading system that can accommodate cards of different thickness. In one embodiment, the assay card reader comprises: (a) a card bay for receiving an assay card; (b) a card interface disposed over or under the card bay, the card interface having a plurality of resilient connectors 319, the card interface having at least two states, a first state in which the card interface is distal from the card bay with the resilient connectors at a fully extended length 319 allowing an assay card to be received in the card bay without making contact with the card interface, and a second state in which the resilient connectors contact the assay card and become at least partially compressed 407. In one embodiment, the resilient connectors are spring connectors. In one embodiment, the spring connectors are spring loaded pins.

In one embodiment, the spring connectors are at least partially compressed as the card interface is actuated into the second state. In one embodiment, the spring connectors are compressed from the fully extended length when the card interface is in the first state to a contact length 407 when the card interface is in the second state, wherein the degree of compression of the spring connectors varies to accommodate varying assay card thicknesses.

In one embodiment, the card reader is configured to receive assay cards having a thickness of 0.1 to 5 mm, or 0.2 to 4 mm, or 0.3 to 3 mm. In one embodiment, the card reader is configured to receive assay cards varying in thickness by a ratio of at least 1:50, or 1:40, or 1:30, or 1:20, or 1:10 from thinnest to thickest.

In one embodiment, the card reader comprises at least one or more resilient members 306 and 321 that bias the assay card up or down to remain in register in the card bay as the assay card is inserted. In one embodiment, the resilient members are leaf springs 321. In one embodiment, the resilient members are configured to be pushed upward by a front edge of the assay card during insertion to allow the assay card to be received past the resilient members in the card bay. In one embodiment, the leaf springs become completely compressed such that the leaf spring becomes flush with the card interface and assay cards of varying thicknesses can be inserted. In one embodiment, the leaf spring solid lengths are configured to receive assay cards have a thickness of 0.1 to 5 mm, or 0.2 to 4 mm, or 0.3 to 3 mm.

In one embodiment, at least one resilient member is configured as a shutter 306 disposed proximate to the slot. In one embodiment, the shutter at least partially blocks light from entering the slot. In one embodiment, the shape of the shutter is configured to be pushed upward by the front edge of the assay card being inserted through the slot in the card reader.

In one embodiment, the card interface comprises a heating element 314, 316, 322, 323, and wherein the resilient connectors compress sufficiently in the second state such that the heating element contacts the assay card.

Another aspect of the invention is an assay card reading system having one or more different heating zones with enhanced cooling and/or interlocks to prevent hot cards from being removed and new cards from being inserted while the reader is too hot. In one embodiment, the card reader comprises: (a) a card bay for receiving an assay card; (b) a card interface above or below the card bay and configured to move vertically, the card interface having at least two states, a first state in which the card interface is distal from the card bay allowing an assay card to be received in the card bay, and a second state in which the card interface contacts an assay card; and (c) at least one discrete heating zone 314, 316, 322, 323 in said card interface which comes into contact with the assay card and controls the temperature of the assay card when the card interface is in the second state. In one embodiment, the card interface comprises at least two or more heating zones 314, 316, 322, 323.

In one embodiment, the heating zones are thermally isolated. In one embodiment, thermal isolation is achieved by constructing the card interface with supports 308 between the heating zones made from material with low thermal conductivity. In one embodiment, the supports are made from polymer materials such as rubber or plastic.

In one embodiment, the heating zones are arranged such that an assay card that is short in length will be exposed only to the first heating zone 316 and 322 and assay cards of increasing length may be exposed to one or more additional heating zones 314 and 323.

In one embodiment, the heating zones have metal heating plates 314, 316, 322, 323 and a closed loop temperature control system. In one embodiment, the heating plates are aluminum. In one embodiment, the heating zones have top heating plates 322 and 323 on the card interface and bottom heating plates 314 and 316 below the card bay.

In one embodiment, the compression force of the card interface on the assay card in the second state prevents removal of the assay card while in a heated state. In one embodiment, the reader is configured to actuate the card interface to the first state to release the compression force of the card interface on the assay card to allow the assay card to be removed. In one embodiment, the reader is configured to actuate the card interface to a third state 506 in which the top heating plate is distal to the bottom heating plate to maximize air flow between the heating plates for faster cooling. In one embodiment, the system further comprises an airflow system 206 having a high flow fan configured to move air between the top and bottom heating plates to maximize cooling.

In one embodiment, one or more obstructing elements 200 and 202 partially block entry into the card bay, and wherein the obstructing elements are locked during the cooling phase to prevent insertion of the assay card until the heating zones have cooled to a set temperature. In one embodiment, the system further comprising a locking mechanism 309 to lock the obstructing elements in place, wherein the card interface is coupled to the locking mechanism such that a certain vertical position 506 of the card interface engages the locking mechanism. In one embodiment, in the third state, the card interface moves vertically to the certain vertical position more distal to the card bay than that in the first state to engage the locking mechanism and lock the obstructing elements in place during cooling. In one embodiment, after cooling, said card interface moves vertically back to said first state such that said locking mechanism disengages from said obstructing elements to allow insertion of said assay card. In one embodiment, the obstructing elements are the second components of the interengagement mechanism.

In one embodiment, said card interface is coupled to said locking mechanism by a spring 311 such that said spring disengages said locking mechanism when said card interface moves vertically from said third state back to said first state.

One aspect of the invention is improved manufacturability of the card by using a uniform body in one embodiment. In one embodiment, the assay card comprises: (a) first and second layers, the first layer overlaying the second layer to define a space 802 therebetween; (b) a microfluidic channel in the space; and (c) wherein the second layer and the channel are formed in a unified body 600.

In one embodiment, the unified body is embossed. In one embodiment, the unified body is imprinted. In one embodiment, the unified body is injection molded. In one embodiment, the unified body is integrally formed. In one embodiment, the unified body is integrally molded.

In one embodiment, the card further comprises at least one of cell walls 704 to define cells within the space, lateral flow enhancers 708 along the channel, or edged structures 709 along the channel, and wherein the cell walls, the lateral flow enhancers, or the edged structures are formed in the unified body. In one embodiment, the card further comprises the cell walls, and wherein the cell walls are formed in the unified body.

In one embodiment, the card further comprises the edged structures, and wherein the edged structures are formed in the unified body. In one embodiment, the card further comprises the lateral flow enhancers, and wherein lateral flow enhancers are formed in the unified body.

In one embodiment, lateral flow enhancers are printed or otherwise deposited on the unified body along the channel. In one embodiment, the lateral flow enhancers are surface treatments.

In one embodiment, the first and second layers are joined adhesively. In one embodiment, the first and second layers are welded together.

One aspect of the invention is improved manufacturability of the card by forming cells between the top and bottom sides. In one embodiment, the card comprises: (a) first and second layers, at least a portion of the first and second layers being spaced apart to create space 802 therebetween; (b) at least one port defined in the first layer; (c) at least one microfluidic channel defined in the space and fluidically coupled to at least one port; and (d) cell walls 704 between the first and second layers, the cell walls defining a plurality of cells 703 in the space.

In one embodiment, at least a portion of the cells are closed cells 703 that do not communicate fluidically so as to prevent fluid communication between the closed cells. In one embodiment, the microfluidic channel is defined at least partially by a portion of the cell walls. In one embodiment, at least a portion of the closed cells do not communicate fluidically with the microfluidic channel.

In one embodiment, at least a portion of the closed cells are hexagonal 703.

In one embodiment, the card further comprises an adhesive 601 between the first layer and the second layer. In one embodiment, at least a portion of the closed cells contain a portion of the adhesive 601. In one embodiment, the adhesive is UV curable. In one embodiment, the UV curable adhesive contains acrylic. In one embodiment, the adhesive is thermally activated. In one embodiment, the adhesive is screen-printed.

In one embodiment, the first layer and the second layer are welded together either thermally or ultrasonically. In one embodiment, at least a portion of the closed cells contain a portion of reflowed material 601.

In one embodiment, at least a portion of the microfluidic channel contains channel supports 807 configured to prevent deformation between the first and second layers.

One aspect of the invention are capillary filament disrupters 709 disposed in the microfluidic channels to disrupt capillary filaments. In one embodiment, the card comprises: (a) at least first and second layers, wherein the second layer defines at least one channel and the first layer overlays the second layer thereby defining at least one corner 803 in the channel between the first and second layers; and (b) one or more capillary filament disrupters disposed in the at least one corner to disrupt capillary filaments.

In one embodiment, the capillary filament disrupters are edged structures 709. In one embodiment, the edged structures are ridges 709. In one embodiment, there are a plurality of the edge structures.

In one embodiment, the plurality of edged structures are in a pattern. In one embodiment, the pattern is at least one of a square wave pattern 708, a sawtooth wave pattern, a triangle wave pattern, or an irregular pattern. In one embodiment, the pattern is a combination of two or more of a square wave pattern, a sawtooth wave pattern, a triangle wave pattern, or an irregular pattern. In one embodiment, the pattern is a repeating pattern. In one embodiment, the repeating pattern has a pitch of 0.1 to 0.5 mm.

In one embodiment, the capillary filament disrupters comprise surface treatments that modify surface energy and wettability. In one embodiment, the surface treatments are bands with a modified contact angle. In one embodiment, there are alternating bands of varying contact angle in a repeating pattern.

One aspect of the invention are lateral flow enhancers 708 to moderate flow in the microfluidic channels. In one embodiment, the card comprises: (a) a base 600; (b) at least one microfluidic channel in or on the base for conducting a flow of a fluid, the microfluidic channel defined by sides 804 and a width 805 between the sides; and (c) one or more lateral flow enhancers, each lateral flow enhancer spanning across at least a substantial portion of the width to create a lateral capillary action perpendicular to the flow, thereby causing flow laterally to the sides to fill the width of the channel before the flow of fluid continues past the lateral capillary enhancer, thereby resulting in flow across the width. In one embodiment, lateral flow enhancer extends entirely across the width.

In one embodiment, lateral flow enhancer is at least one of a structural element 708 or a surface treatment or a combination thereof. In one embodiment, one or more of lateral flow enhancer are weirs 708 that increase resistance to the flow along the channel. In one embodiment, the weirs comprise straight or curved bands 708. In one embodiment, the microfluidic channel has a channel height 806, and wherein the bands have a band height that is 5% to 25% the channel height.

In one embodiment, lateral flow enhancer comprises surface treatments that modify surface energy and wettability. In one embodiment, the surface treatment is printed or otherwise deposited on a surface of the microfluidic channel.

In one embodiment, the lateral flow enhancers are disposed along the microfluidic channel at a pitch of 50 to 500 microns. In one embodiment, the lateral flow enhancers are disposed in a repeating pattern. In one embodiment, the repeating pattern is such that the lateral flow enhancers are equally spaced from one another along the channel. In one embodiment, the repeating pattern is such that there are alternating bands of varying contact angle from surface treatment.

In one embodiment, the channel is formed by first and second layers, and the lateral flow enhancers are formed in or on one of the layers. In one embodiment, the lateral flow enhancers are printed or otherwise deposited onto at least one of the first or second layers.

In one embodiment, the lateral flow enhancers are formed in the second layer, and wherein the second layer is selected from one of Tritan co-polymer, polycarbonate, or cyclic olefin copolymer. In one embodiment, the second layer is Tritan co-polymer.

One aspect of the invention is capacitive monitoring of flow in the microfluidic channel for high resolution metering and/or to detect reuse of previously wetted test cards, and/or test cards with inadequate volume. In one embodiment, the card comprises: (a) a base; (b) at least one microfluidic channel defined in or on the base, the channel configured to conducting fluid from a port: and (c) two or more capacitive elements 613 and 614 positioned consecutively along the channel, the capacitive elements being electrically connected by a conductive traces 615 outside of the channel such that a discrete increase in capacitance is detectable as the fluid flows from one capacitive element to a consecutive capacitive element. In one embodiment, the two or more capacitive elements comprise more than three consecutive capacitive elements.

In one embodiment, the capacitive elements are positioned adjacent to at least one reference element 616 that is set at a fixed voltage. In one embodiment, the capacitive elements and adjacent reference elements are interdigitated. In one embodiment, consecutive capacitive elements share a reference element.

In one embodiment, the capacitive element comprises a conductive element 613 and 614 covered with a dielectric 617 within the channel. In one embodiment, the conductive elements are silver. In one embodiment, the conductive elements are screen-printed with silver ink. In one embodiment, the silver conductive elements are covered at least partially by carbon. In one embodiment, the dielectric is a screen-printed dielectric ink.

In one embodiment, the channel contains at least one exposed conductive element 702 not covered by dielectric such that contact between the exposed conductive element and the fluid sample results in a short circuit. In one embodiment, the exposed conductive element is positioned consecutively downstream from the capacitive elements, the capacitive elements and at least one exposed conductive element also being electrically connected by conductive traces outside of the flow cell.

In one embodiment, the distance between consecutive capacitive elements is greater than the size of the meniscus of the fluid in the channel. In one embodiment, the ratio of the distance between consecutive capacitive elements and the thickness of each element is between 3 and 50, or 5 and 30, or 10 and 20.

These and other advantages maybe realized in accordance with the specific embodiments described as Well as other variations. It is to be understood that the above description is intended to be illustrative, and not restrictive Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

What is claimed is:

1. An assay card comprising:

a base comprising first and second layers, at least a portion of said first and second layers being spaced apart to create space therebetween;

at least one port defined in said first layer;

at least one microfluidic channel in said space and fluidically coupled to at least one port, said at least one microfluidic channel having sides and a width between said sides; and cell walls between said first and second layers, said cell walls defining a plurality of cells in said space, at least a portion of said cells being closed cells that do not communicate fluidically thereby preventing fluid communication between said closed cells; and one or more lateral flow enhancers, each lateral flow enhancer spanning across said width to create a lateral capillary action perpendicular to said flow, thereby causing flow laterally across said width to fill said width of said channel before said flow of fluid continues past said lateral capillary enhancer.

2. The assay card of claim 1, wherein said microfluidic channel is defined at least partially by a portion of said cell walls.

3. The assay card of claim 2, wherein at least a portion of said closed cells do not communicate fluidically with said microfluidic channel.

4. The assay card of claim 1, wherein at least a portion of said closed cells are hexagonal.

5. The assay card of claim 1, further comprising an adhesive between said first layer and said second layer.

6. The assay card of claim 5, wherein at least a portion of said closed cells contain a portion of said adhesive.

7. The assay card of claim 1, wherein said first layer and said second layer are welded together either thermally or ultrasonically.

8. The assay card of claim 7, wherein at least a portion of said closed cells contain a portion of reflowed material.

9. An assay card comprising:

a base;

at least one microfluidic channel in or on said base for conducting a flow of a-fluid, said microfluidic channel defined by sides and a width between said sides; and a plurality of lateral flow enhancers disposed in a repeating pattern; at a pitch of 50 to 500 microns, each lateral flow enhancer extends entirely across said width to create a lateral capillary action perpendicular to said flow of fluid, thereby causing flow laterally across said width to fill said width of said channel before said flow of fluid continues past said lateral capillary enhancer, thereby creating a uniform front of said flow of fluid within said channel.

10. The assay card of claim 9, wherein said base is a first layer and further comprising a second layer, said first layer overlaying said second layer to define a space therebetween; said at least one microfluidic channel in said space; and wherein said second layer and said channel are formed in a unified body.

11. The assay card of claim 10, further comprising at least one of cell walls to define cells within said space, lateral flow enhancers along said channel, or edged structures along said channel, and wherein said cell walls, said lateral flow enhancers, or said edged structures are formed in said unified body.

12. The assay card of claim 10, wherein said unified body is a preform.

13. The assay card of claim 12, wherein said unified body is embossed or imprinted.

14. The assay card of claim 10, wherein said unified body is integrally molded.

15. The assay card of claim 10, wherein at least a portion of said microfluidic channel contains channel supports configured to prevent deformation between said first and second layers.

16. The assay card of claim 9, wherein lateral flow enhancer is at least one of a structural element or a surface treatment or a combination thereof.

17. The assay card of claim 16, wherein one or more of lateral flow enhancer are weirs that increase resistance to said flow along said channel.

18. The assay card of claim 17, wherein said weirs comprise straight or curved bands.

19. The assay card of claim 17, wherein said weirs are 5 to 25% of the overall height of the microfluidic channel.

20. The assay card of claim 16, wherein lateral flow enhancer comprises surface treatments that modify surface energy and wettability.

21. The assay card of claim 9, wherein said base is a first layer, and further comprising:

a second layer, wherein said second layer defines said at least one microfluidic channel and said first layer overlays said second layer thereby defining at least one corner in said channel between said first and second layers; and one or more capillary filament disrupters disposed in said at least one corner to disrupt capillary filaments.

22. The assay card of claim 21, wherein said capillary filament disrupters are edged structures.

23. The assay card of claim 22, wherein said edged structures are ridges.

24. The assay card of claim 22, wherein a plurality of said edged structures are in a pattern.

25. The assay card of claim 21, wherein said capillary filament disrupters comprise surface treatments that modify surface energy and wettability.

26. The assay card of claim 25, wherein said surface treatments are alternating bands with a varying contact angle.

27. An assay card comprising:

a base comprising first and second layers, said second layer defining at least one microfluidic channel, said microfluidic channel having sides and a width between said sides, said first layer overlaying said second layer thereby defining at least one corner in said channel between said first and second layers; and one or more capillary filament disrupters disposed in said at least one corner to disrupt capillary filaments, wherein said capillary filament disrupters are edged structures, wherein a plurality of said edged structures are in a pattern, wherein said pattern is a repeating pattern having a pitch of 0.1 to 0.5 mm; and one or more lateral flow enhancers, each lateral flow enhancer spanning across said width to create a lateral capillary action perpendicular to said flow, thereby causing flow laterally across said width to fill said width of said channel before said flow of fluid continues past said lateral capillary enhancer.

* * * * *